(12) United States Patent
Hoffman et al.

(10) Patent No.: US 6,980,670 B1
(45) Date of Patent: Dec. 27, 2005

(54) BIOMETRIC TOKENLESS ELECTRONIC REWARDS SYSTEM AND METHOD

(75) Inventors: Ned Hoffman, Sebastopol, CA (US); David Ferrin Pare, Jr., Berkeley, CA (US); Jonathan Alexander Lee, Oakland, CA (US); Philip Dean Lapsley, Newton, MA (US)

(73) Assignee: Indivos Corporation, San Francisco, CA (US)

( * ) Notice: Subject to any disclaimer, the term of this patent is extended or adjusted under 35 U.S.C. 154(b) by 601 days.

(21) Appl. No.: 09/794,810

(22) Filed: Feb. 26, 2001

Related U.S. Application Data

(63) Continuation of application No. 09/020,363, filed on Feb. 9, 1998, now abandoned.

(51) Int. Cl.[7] .............................. G06K 9/00; G06F 17/60
(52) U.S. Cl. ........................................ 382/115; 705/14
(58) Field of Search ...................... 382/100, 115–128, 382/305; 705/14, 44, 18, 64, 67

(56) References Cited

U.S. PATENT DOCUMENTS

| | | | |
|---|---|---|---|
| 4,821,118 A | 4/1989 | Lafreniere | 358/108 |
| 4,837,422 A | 6/1989 | Dethloff et al. | 364/408 |
| 4,961,142 A | 10/1990 | Elliott et al. | 364/408 |
| 4,993,068 A | 2/1991 | Piosenka et al. | 380/23 |
| 4,995,086 A | 2/1991 | Lilley et al. | 382/4 |
| 4,998,279 A | 3/1991 | Weiss | 340/825 |
| 5,025,372 A | 6/1991 | Burton et al. | 364/406 |
| 5,036,461 A | 7/1991 | Elliott et al. | 364/408 |
| 5,054,089 A | 10/1991 | Uchida et al. | 382/4 |
| 5,095,194 A | 3/1992 | Barbanell | 235/380 |
| 5,109,427 A | 4/1992 | Yang | 382/4 |
| 5,109,428 A | 4/1992 | Igaki et al. | 382/5 |
| 5,144,680 A | 9/1992 | Kobayashi | 250/556 |
| 5,146,102 A | 9/1992 | Higuchi et al. | 250/556 |
| 5,161,204 A | 11/1992 | Hutcheson et al. | 382/190 |
| 5,168,520 A | 12/1992 | Weiss | 380/23 |
| 5,180,901 A | 1/1993 | Hiramatsu | 235/380 |
| 5,191,611 A | 3/1993 | Lang | 380/25 |
| 5,210,588 A | 5/1993 | Lee | 356/71 |

(Continued)

FOREIGN PATENT DOCUMENTS

EP 0598469 A2 5/1994

(Continued)

OTHER PUBLICATIONS

Anderson, T., et al., Security Management, V. 37, No. 11 (Nov. 1993); pp. 17-19.

(Continued)

*Primary Examiner*—Joseph Mancuso
*Assistant Examiner*—Duy M. Dang
(74) *Attorney, Agent, or Firm*—Marger Johnson & McCollom, P.C.

(57) ABSTRACT

Disclosed is a system and method for processing tokenless electronic consumer rewards between a reward provider and a recipient using an electronic identicator comparator and at least one recipient biometric data. The process uses apparatus for creating an electronic registry of a reward provider's products or services each having a predetermined rewards value, the rewards being disbursed to recipients based upon the occurrence of predetermined criteria; recipient registration, wherein the recipient registers with the electronic identicator comparator at least one registration biometric sample, and recipient specific data; recipient identification, wherein the identicator comparator compares a recipient bid biometric sample with previously registered biometric samples for producing either a successful or failed identification of the recipient; and recipient rewards issuance, wherein the rewards provider issues rewards to the recipient. This method and system can process an electronic consumer rewards transaction without the recipient using any unique identification tokens.

53 Claims, 9 Drawing Sheets

U.S. PATENT DOCUMENTS

| | | | |
|---|---|---|---|
| 5,210,797 A | 5/1993 | Usui et al. | 382/4 |
| 5,222,152 A | 6/1993 | Fishbine et al. | 382/2 |
| 5,229,764 A | 7/1993 | Matchett et al. | 340/825.34 |
| 5,230,025 A | 7/1993 | Fishnine et al. | 382/4 |
| 5,239,583 A | 8/1993 | Parrillo | 380/23 |
| 5,241,606 A | 8/1993 | Horie | 382/4 |
| 5,251,259 A | 10/1993 | Mosley | 380/23 |
| 5,265,162 A | 11/1993 | Bush et al. | 380/24 |
| 5,274,695 A | 12/1993 | Green | 379/88 |
| 5,276,314 A | 1/1994 | Martino et al. | 235/380 |
| 5,280,527 A | 1/1994 | Gullman et al. | 380/23 |
| 5,321,242 A | 6/1994 | Heath, Jr. | 235/382 |
| 5,325,442 A | 6/1994 | Knapp | 382/4 |
| 5,335,288 A | 8/1994 | Faulkner | 382/115 |
| 5,343,529 A | 8/1994 | Goldfine et al. | 380/23 |
| 5,351,303 A | 9/1994 | Willmore | 382/4 |
| 5,412,738 A | 5/1995 | Brunelli et al. | 382/115 |
| 5,465,303 A | 11/1995 | Levison et al. | 382/124 |
| 5,485,510 A | 1/1996 | Colbert | 379/145 |
| 5,546,523 A | 8/1996 | Gatto | 395/156 |
| 5,613,012 A | 3/1997 | Hoffman et al. | 382/115 |
| 5,615,277 A | 3/1997 | Hoffman | 382/115 |
| 5,621,812 A | 4/1997 | Deaton et al. | 382/100 |
| 5,719,950 A | 2/1998 | Osten et al. | 382/115 |
| 5,892,824 A | 4/1999 | Beatson et al. | 713/186 |
| 6,012,039 A * | 1/2000 | Hoffman et al. | 382/115 |
| 6,028,950 A | 2/2000 | Merjanian | 382/126 |
| 6,040,783 A | 3/2000 | Houvener et al. | 340/5.53 |
| 6,105,010 A | 8/2000 | Musgrave | 705/44 |
| 6,202,151 B1 | 3/2001 | Musgrave et al. | 713/186 |
| 6,310,966 B1 | 10/2001 | Dulude et al. | 382/115 |

FOREIGN PATENT DOCUMENTS

| | | |
|---|---|---|
| EP | 0 651 357 A1 | 5/1995 |
| WO | WO/95/13591 | 5/1995 |

OTHER PUBLICATIONS

Holmes et al., *A Performance Evaluation of Biometric Identification Devices*, Sandia National Laboratories, Albuquerque, NM, Jun., 1991.

* cited by examiner

R Database/Outside

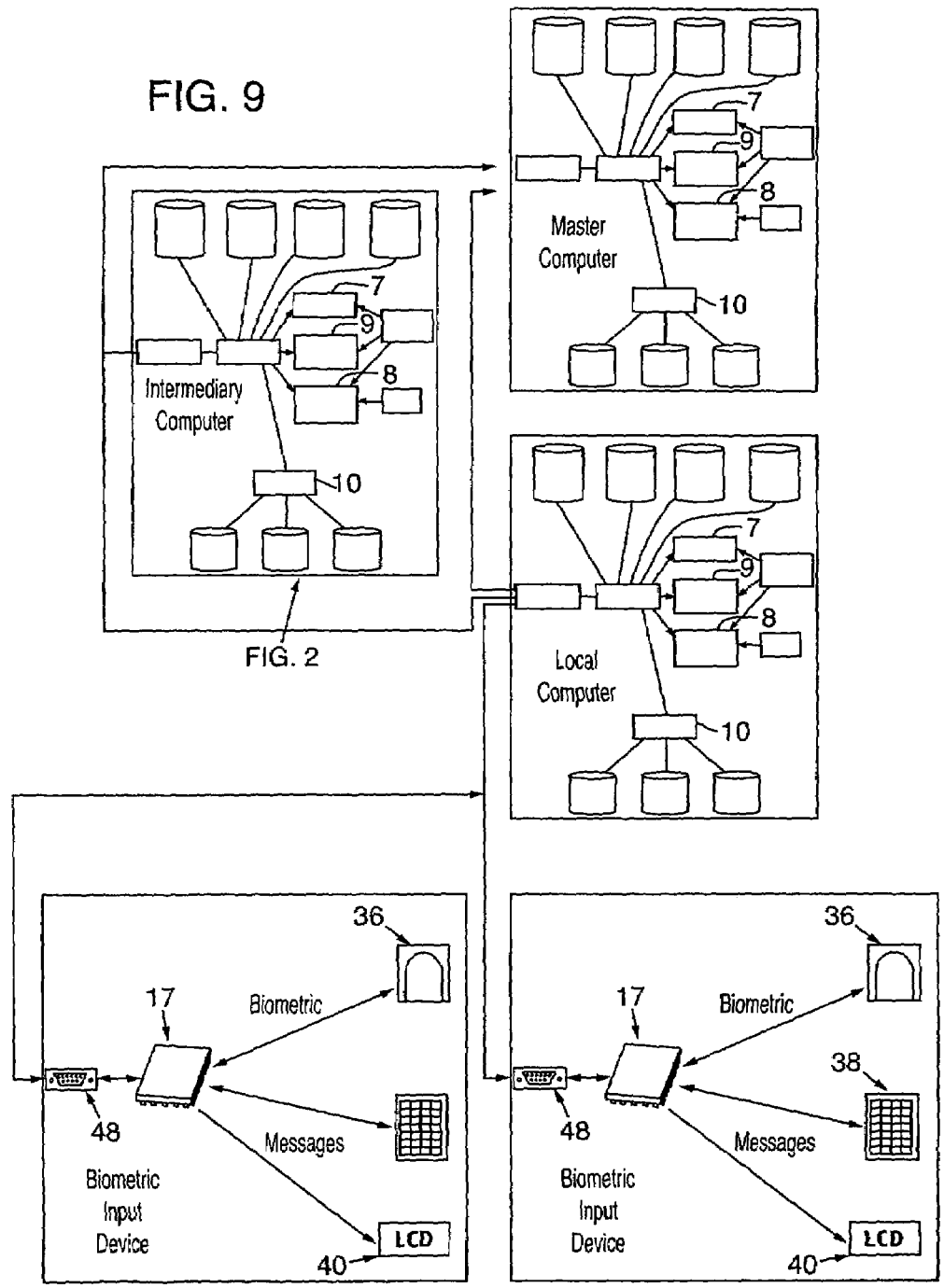

BIOMETRIC TOKENLESS ELECTRONIC REWARDS SYSTEM AND METHOD

RELATED APPLICATION DATA

This application is a continuation of the U.S. Ser. No. 09/020,363, filed Feb. 9, 1998 now abandoned.

FIELD

The invention relates generally to electronic rewards computer systems designed to calculate and store incentive rewards, and more specifically to biometric tokenless computer systems which do not require the recipient to use any man-made portable memory devices such as smart cards or magnetic swipe cards.

BACKGROUND

Consumer-oriented rewards systems have become an integral part of retail point of sale and internet commerce marketing. Retailers have multiple objectives: to attract consumers to increase the price-point of their purchases; to induce consumers to increase the frequency of their purchases from a particular retailer, and establishing a loyal purchasing pattern by the consumer with that retailer; to increase the number of consumers who purchase from a particular retailer, and to obtain demographic data from consumers about their purchasing. Rewards systems are often customized for each reward provider, hence the recipient must carry a different rewards token for each retailer in order to receive that retailer's consumer incentive rewards. Hence, in addition to their debit and credit cards, consumers are now encumbered with additional cards to carry, all of which can easily be lost, damaged or stolen. After initially signing up with these incentive programs, consumers soon dispense with their incentive cards, therefore, either the consumer incentive program offered by the retailer fails or is not as successful as it was once thought to be.

Such rewards systems may take many forms, such as providing the consumer with immediate discounts on purchased goods, accrued miles on frequent flyer programs offered by airlines, or accrued points towards the purchase of a product.

Additionally, the use of cards by consumers for accessing such rewards systems is costly and disadvantageous. Namely, retailers must absorb the cost of producing such tokens and then distributing them to consumers. Furthermore, as tokens are lost, damaged, or stolen, retailers absorb the cost of replacing the token to the consumer. Further, retailers use these tokens to only identify the consumer's rewards account, rather than being able to identify the consumer directly.

Last, such tokens have additional costs to the retailer in that the desired demographic and purchasing-pattern data can be easily de-linked once the token is separated from the consumer. This occurs because a fraudulent party makes purchases with a token that incorrectly identifies the user's rewards account as the original consumer's, thereby attributing such purchases by the fraudulent party to the original consumer's purchasing profile. At the same time, when the genuine consumer demands their rightful rewards upon making their own purchases without their appropriate rewards token, the retailer must use another, likely generic (e.g., store account), rewards account in order to accommodate that consumer's requirement of benefiting from the incentives rightly due to them based on their purchases.

Hence, the retailer's franchise on accurate consumer purchasing patterns can be significantly diluted by such unreliable information, thereby causing the retailer additional losses as their target-marketing campaigns and inventory-efficiency strategies are adversely affected by this inaccurate demographic data.

The use of various biometrics, such as fingerprints, hand prints, voice prints, retinal images, handwriting samples and the like have been suggested for identification of individuals. However, because the biometrics are generally stored in electronic (and thus reproducible) form on a token and because the comparison and verification process is not isolated from the hardware and software directly used by the recipient attempting access, the problem of having to carry cards is not alleviated.

It has also been suggested that smartcards can also be used for tracking the rewards accrued by a consumer. However, smartcard-based system will cost significantly more than the "dumb" card. A smartcard costs in excess of $3, and a biometric smartcard is projected to cost in excess of $5. In addition, each point of sale station would need a smartcard reader. Furthermore, the net result of "smartening" the token is centralization of function. This may look interesting during design, but in actual use results in increased vulnerability for the consumer. Given the number of functions that the smartcard will be performing, the loss or damage of this all-controlling card will be excruciatingly inconvenient for the cardholder. Losing a card full of accrued rewards will result loss of the accumulated rewards.

There is a need for an electronic rewards transaction system that uses a strong link to the person being identified, as opposed to merely verifying a recipient's possession of any physical objects that can be freely transferred.

A further need in an electronic rewards transaction system is ensuring consumer convenience by providing authorization without forcing the consumer to possess, carry, and present one or more proprietary tokens, such as man-made portable memory devices, in order to accumulate the rewards. Anyone who has lost a card, left it at home, had a card stolen knows well the keenly and immediately-felt inconvenience caused by such problems. Therefore, there is a need for an electronic biometric rewards transaction system that is entirely tokenless.

There is another need in the industry for a transaction system that is sufficiently versatile to accommodate both consumers who desire to use personal identification numbers (PINs) for added security and also consumers who prefer not to use them.

Lastly, such a system must be affordable and flexible enough to be operatively compatible with existing networks having a variety of electronic transaction devices and system configurations.

SUMMARY

It is an object of the invention therefore to provide a computer system that eliminates the need for a user to possess and present a man-made memory device, such as a smart card or magnetic swipe card, in order to initiate a system access request.

It is another object of the invention to provide a computer system that is capable of verifying a user's identity, as opposed to verifying possession of propriety objects and information. It is yet another object of the invention to verify user identity based on one or more unique characteristics physically personal to the user.

Yet another object of the invention is to provide a computer system wherein access is secure, yet designed to be convenient and easy for a consumer to use. Yet another object of the invention is to enable a user to earn incentive rewards which are either immediately provided to the user or are stored for later access by the user.

Yet another object of the invention is to enable retailers to correctly identify a consumer using the computer system so that their purchasing patterns can be linked to their personal demographic data. In this way, the retailer can more efficiently deliver products and services to pre-identified or interested consumers. A method for processing tokenless electronic consumer rewards is described between a reward provider and a recipient using an electronic identicator comparator and at least one recipient biometric data. The method comprises creating an electronic registry of a reward provider's products or services each having a predetermined rewards value, the rewards being disbursed to recipients based upon the occurrence of predetermined criteria; a recipient registration step, wherein the recipient registers with the electronic identicator comparator at least one registration biometric sample, and recipient specific data; a recipient identification step, wherein the identicator comparator compares a recipient bid biometric sample with previously registered biometric samples for producing either a successful or failed identification of the recipient; and recipient rewards issuance step, wherein the rewards provider issues rewards to the recipient, wherein an electronic consumer rewards transaction is conducted without the recipient using any tokens, such as any plastic card or driver's licenses, or man-made portable memory devices, during the identification step. The present invention satisfies these needs by providing a significantly improved system and method for processing tokenless electronic consumer rewards between a reward provider and a recipient using an electronic identicator comparator and at least one recipient biometric data, comprising; creating an electronic registry of a reward provider's products or services each having a predetermined rewards value, the rewards being disbursed to recipients based upon the occurance of predetermined criteria; recipient registration, wherein the recipient registers with the electronic identicator comparator at least one registration biometric sample, and recipient specific data; recipient identification, wherein the identicator comparator compares a recipient bid biometric sample with previously registered biometric samples for producing either a successful or failed identification of the recipient; and recipient rewards issuance, wherein the rewards provider issues rewards to the recipient. The above-mentioned method and system processes an electronic consumer rewards transaction without the recipient using any tokens such as any plastic card or drivers licenses, or man made portable memory devices such as smart cards, or magnetic stripe cards.

According to one embodiment of the invention, there is a system and a method for processing tokenless electronic rewards transactions between a reward provider and a recipient comprising: recipient rewards registry recordation, wherein an electronic record is created of a registry of a reward provider's products and the rewards that accrue to a recipient based upon the recipient's purchase of said products; recipient registration, wherein the recipient registers with the electronic identicator system at least one registration biometric sample; a proposal, wherein the reward provider proposes a commercial transaction to the recipient; recipient identification, wherein the electronic identicator compares a recipient bid biometric sample with previously registered biometric samples for producing either a successful or failed identification of the recipient; electronic rewards calculation, wherein upon the successful identification of the recipient, the recipient's rewards are calculated resultant from the recipient's product purchases pursuant to the reward provider's proposed commercial transaction and pursuant to the recipient purchasing registry; recipient notification, wherein pursuant to the consummation of the commercial transaction, the recipient is notified of the results of the electronic rewards calculation; and, wherein a tokenless electronic rewards transaction is conducted without the recipient using any portable man-made memory devices such as smartcards or magnetic stripe cards.

According to several embodiments of this invention, the recipient rewards registry may take many forms: it may be a registry of immediate cash discounts or rebates provided to recipient during a commercial transaction; it may be the accrual of points which are credited towards the future purchase of a product or service, such as an automobile, frequent flyer miles, or free air time for phone calls. The rewards within said registry may be tied, for example, to certain product purchases, certain purchasing patterns reflecting frequency or loyalty, or certain purchase dollar amounts.

According to another embodiment of this invention, the system and the method may further provide a commercial transaction adjustment step, wherein the reward provider's proposed commercial transaction is adjusted pursuant to the electronic rewards calculation.

In yet another embodiment of the invention, there is a system and method for processing tokenless electronic rewards transactions between a reward provider and a recipient comprising: recipient rewards registry recordation, wherein an electronic record is created of a registry of a reward provider's products and the rewards that accrue to a recipient based upon the recipient's purchasing of said products; recipient registration, wherein the recipient registers with the electronic identicator system at least one registration biometric sample and an electronic rewards account; a proposal, wherein the reward provider proposes a commercial transaction to the recipient; recipient identification, wherein the electronic identicator compares a recipient bid biometric sample with previously registered biometric samples for producing either a successful or failed identification of the recipient; electronic rewards calculation, wherein upon the successful identification of the recipient, the recipient's rewards are calculated resultant from the recipient's product purchases in the reward provider's proposed commercial transaction and pursuant to the recipient purchasing registry; recipient rewards account adjustment, wherein the recipient's rewards account is adjusted pursuant to the electronic rewards calculation; recipient notification, wherein pursuant to the consummation of the commercial transaction, the recipient is notified of the results of the recipient rewards account adjustment; and, wherein a tokenless electronic rewards transaction is conducted without the recipient using any portable man-made memory devices such as smartcards or magnetic stripe cards.

In yet another embodiment of the invention, the accrued rewards resultant from recipient's purchases are stored in the recipient's or user's rewards account, along with the recipient's corresponding demographic data and purchasing patterns.

For some rewards transactions, it is not appropriate to conduct an immediate adjustment of either the commercial transaction or the recipient's rewards account. These cases include transactions where the exact reward to be credited is not known at the time of commercial transaction, or when a recipient's purchasing patterns or demographics need to be analyzed in order to determine the appropriate award. As a result, in an alternate embodiment of the invention, the computer system stores the recipient's purchases, purchasing patterns, and/or demographic data for subsequent analysis, instead of executing an immediate rewards calculation.

In yet another embodiment of the invention, the computer system communicates with one or more external computer systems in order to perform various functions, including determining if the recipient has multiple rewards that are linked to certain purchases.

In another embodiment of the invention, the recipient is co-located with the reward provider, and transaction proposals and other information is transmitted from reward provider to recipient and vice versa using a computer network such as an Intranet. In another embodiment of the invention, the recipient is remote from the reward provider, and transaction proposals and other information is transmitted from reward provider to recipient and vice versa using a computer network such as the Internet.

In most instances, the recipient being identified and the computer system are remote and physically separate from each other. All electronic communications to and from the computer system are encrypted using industry standard encryption technology, preferably the DES (Data Encryption Standard) with 112-bit encryption keys. Each identification station has its own set of encryption keys that are known only to that particular station and the computer system.

In another embodiment of the invention, the rewards transaction computer system further comprises a fraud detector engine further comprising a fraud biometric comparator and fraud biometric data bases containing a subset of the biometric samples stored in the master computer. The biometric samples of individuals who have previously attempted fraud upon the identification computer system are stored within the fraud biometric database. Thereafter, the biometric samples of those who are registering with the system are compared against the biometric samples in the fraud biometric sample database to screen for fraud attempts. This system therefore will eliminate registration of repeat offenders.

In another embodiment of the invention, the recipient uses a PIN as a secondary security means in addition to his biometric. As such, the invention incorporates something the recipient uniquely possesses (his biometric) with something the recipient uniquely knows (his PIN).

In another embodiment of the invention, the recipient may create his own PIN. The computer system then conducts a comparison of the biometric gathered with any biometrics already grouped with the selected PIN. Such a grouping of any biometrics associated with the same PIN is known herein as a PIN basket. In the event the new registrant's biometric is too similar to any of the registered biometrics currently in the selected PIN basket, that PIN is rejected and an alternative PIN is selected by the recipient for another such biometric comparison. Once the computer system is presented with a PIN basket that has no confusingly similar biometrics, the new registrant's biometric is stored in that PIN basket.

In another embodiment of the invention, the recipient may select a PIN from several generated for him by the computer system. This is done by having the computer system automatically conduct comparisons of the new registrant's biometric with any biometrics resident in various PIN baskets. Once the computer system has generated several PIN options without a confusingly similar biometric, these PINs are presented to the new registrant from which the recipient may select one PIN. In another embodiment of the invention, in the unlikely event of the theft of biometric information, the situation can be remedied by simply changing the PIN basket in which the person's biometric samples reside. After this is done, the criminal can no longer use the biometric sample to authorize transactions.

In another embodiment of the invention, the transaction rewards computer system utilizes a method for rapid search of previously stored biometric samples from individuals using at least two biometric baskets, at least one biometric basket containing at least two algorithmically unique biometric samples from different individuals. Each biometric basket is represented by the recipient's PIN and contains less than the total number of samples registered with the system. Therefore, each biometric basket is identified by the recipient's personal identification number, and is known herein as a "biometric basket code" or "BBC". The method comprises: a storage step further comprising gathering a biometric from an individual; selection of a recipient's personal identification number that indexes a biometric basket, hence creating the BBC; locating the biometric basket identified by the BBC; comparing the biometric sample gathered from said individual with all previously stored biometric samples in the BBC to make sure that the biometric sample gathered from the individual is algorithmically unique from all biometric samples currently stored in said biometric basket, for producing a successful or failed uniqueness result. Upon return of a successful uniqueness result, the gathered biometric sample is stored in the selected biometric basket. There is a bid step further comprising: a) entering a bid personal identification number by a candidate individual, and; b) entering a bid biometric sample by said candidate individual. There is also a comparison step comprising: a) locating the BBC that is entered by said candidate individual, and; b) comparison of the bid biometric sample from said candidate individual with all of the biometric samples stored in the identified BBC for producing either a successful or failed identification result.

In another embodiment of the invention, the transaction rewards computer utilizes a system and method for rapid search of previously stored biometric samples using conversion of an image-enhanced digitized raster biometric sample, such as a fingerprint image, to vector lines in order to generate an identification value for the biometric sample. Any biometric can be used, such as a fingerprint, retina of the eye, iris of the eye, voice print, facial vascular patterns and the like. In the example of fingerprints, the raster image pixels are converted to vector lines along the fingerprint ridges and the vector lines are classified and converted according to type. The line types are then analyzed and a list of identification features corresponding to the vector line types is generated. The identification features between the vector lines types are compared and the image is classified according to fingerprint class. The computer system then generates a numerical encoding to classify the biometric sample's identifying features. This number is known herein as a biometric sorting number, or "BSN".

The BSN may be a number shared by several registered biometrics which have similar principle biometric characteristics, or it may be a number containing one singular biometric. In the case of fingerprints, the present fingerprint identification system, based on well-known research performed by Sir Edward Richard Henry and further by the United States Federal Bureau of Investigation, uses such main number classifications as arches, loops, and whorls. Therefore, all fingerprints with a similar loop pattern may be located within the same BSN. Subsequent to this initial search, the biometric will then have to be compared to all biometrics in that BSN in order to make a determination that the submitted biometric matches the correlated registration biometric. Alternatively, the to computer may directly generate a BSN specifying that unique fingerprint and placing it in a file with no other biometrics. This BSN is generated directly by a more detailed analysis of the biometric sample's characteristics in order to determine that it is distinct from all previously registered biometrics, whether they reside in a BSN or whether they are in their own singular file. Such algorithmically-based biometric characteristic sorting and classification systems, using mathematical algorithms, are known in the art for fingerprints and for other biometrics such as retina of the eye, voice print, and face vascular patterns.

In another embodiment of the invention, the transaction rewards computer system has a use-sensitive tokenless identification means for rapidly determining a frequent user's identity by performing a comparison of the frequent user's biometric with other frequent user biometric stored in a local computer which contains a subset of the total system's biometric samples. This same means can be used for rapidly accessing and amending a recipient's rewards account. This system comprises at least two local computer systems and a master computer system. The master computer has a master computer comparison engine, also referred to as a comparator. The master computer comparator further has a master user biometric database which contains or stores the biometric samples or rewards accounts of all users registered with the rewards transaction computer system. The computer system further comprises at least two local computers which are physically remote from each other. Each local computer further comprises a local user biometric database containing a subset of the biometric samples or rewards accounts contained in the master central database. If upon submission of a bid biometric or a bid rewards account, a local computer returns a failed identification result, the bid biometric or rewards account is transmitted to the master computer for comparison of the entered bid biometric sample or rewards account to the biometric samples or rewards accounts stored in the master comparator for producing either a failed or successful second identification result.

In another embodiment of the invention, the local computers are connected to each other by third interconnecting means such as an ATM network, the Internet, a private intranet, a telephone network, or a cable TV network. If a first local computer returns a failed identification result, in addition to or independent of the search of the master computer biometric sample or rewards database, the biometric sample or rewards database of a second local computer can also be searched, as the local computers' biometric sample or rewards account databases contain a subset of biometric samples or rewards accounts from the master computer and different sets of biometric samples or rewards accounts from each other.

Another embodiment of the invention utilizes an identification computer system authenticator wherein a private code, distinct from a personal identification number and not used to gain access to the computer system, is previously gathered from the user and recorded in the central computer data bases, and is presented to only the user after an identification attempt, whereby the user is assured that the authentic computer system was used to process the account access because a false computer system would not be able to present the customer's private code.

The present invention is clearly advantageous over the prior art in a number of ways. First, it is extremely easy and efficient for the consumer to use because it eliminates the need to carry and present any tokens in order to access one's rewards accounts. The present invention eliminates all the inconveniences associated with carrying, safeguarding, and locating tokens. Further, because tokens are often specific to a particular computer system that further requires remembering a secret PIN code assigned to the particular token, this invention offers eliminates all such tokens and also offers the option of eliminating the need for memorization and recollection of any PIN. The consumer is now uniquely empowered, by means of this invention, to conveniently conduct his personal and/or professional electronic rewards transactions at any time without dependence upon tokens which may be stolen, lost, damaged, or forgotten.

The invention is clearly advantageous from a convenience standpoint to retailers by making electronic rewards transactions less cumbersome and more spontaneous. The paperwork of electronic rewards transactions is significantly reduced as compared to card purchases wherein separate receipts are generated and must be retained by the reward provider and the consumer.

Because the system of the invention is designed to provide a consumer with simultaneous direct access to all of his rewards accounts, the need for transactions involving cash money, checks, credit drafts and the like will be greatly reduced, thereby reducing the cost of equipment and staff required to collect, account, and process such transactions and their associated paperwork.

Moreover, the invention is markedly advantageous and superior to existing systems in being highly fraud resistant. As discussed above, present authorization systems are inherently unreliable because they base determination of a user's identity on the physical presentation of a manufactured object along with, in some cases, information that the user knows. Unfortunately, both the token and information can be transferred to another, through loss, theft or by voluntary action of the authorized user. Thus, unless the loss or unintended transfer of these items is realized and reported by the authorized user, anyone possessing such items will be recognized by existing authorization systems as the consumer to whom that token and its corresponding rewards accounts are assigned.

The invention further prevents fraud by storing authentication information and carrying out identity verification operations at a location that is operationally isolated from the user requesting authorization, thereby preventing the user from acquiring copies of the authentication information or from tampering with the verification process. Such a system is clearly superior to existing token-based systems wherein the biometric authentication information are stored on and can be recovered from the token, and wherein the actual identity determination is performed at the same location as the user during the authorization process.

These and other advantages of the invention will become more fully apparent when the following detailed description of the invention is read in conjunction with the accompanying drawings.

BRIEF DESCRIPTION OF THE DRAWINGS

FIGS. 8 and 9 show the embodiments of the invention using the DPC of FIG. 2 and the terminal of FIG. 3 in various system configurations which employ DPC procedures related to use sensitivity of the system.

DETAILED DESCRIPTION

The invention provides a tokenless method for identifying recipients for the purpose of authorizing an electronic rewards transactions. In a preferred embodiment, consumers conduct these transactions without the use of a personal identification number ("PIN") or any tokens, such as cards, badges or identification cards including drivers licenses, or telephone numbers.

Figure 1:
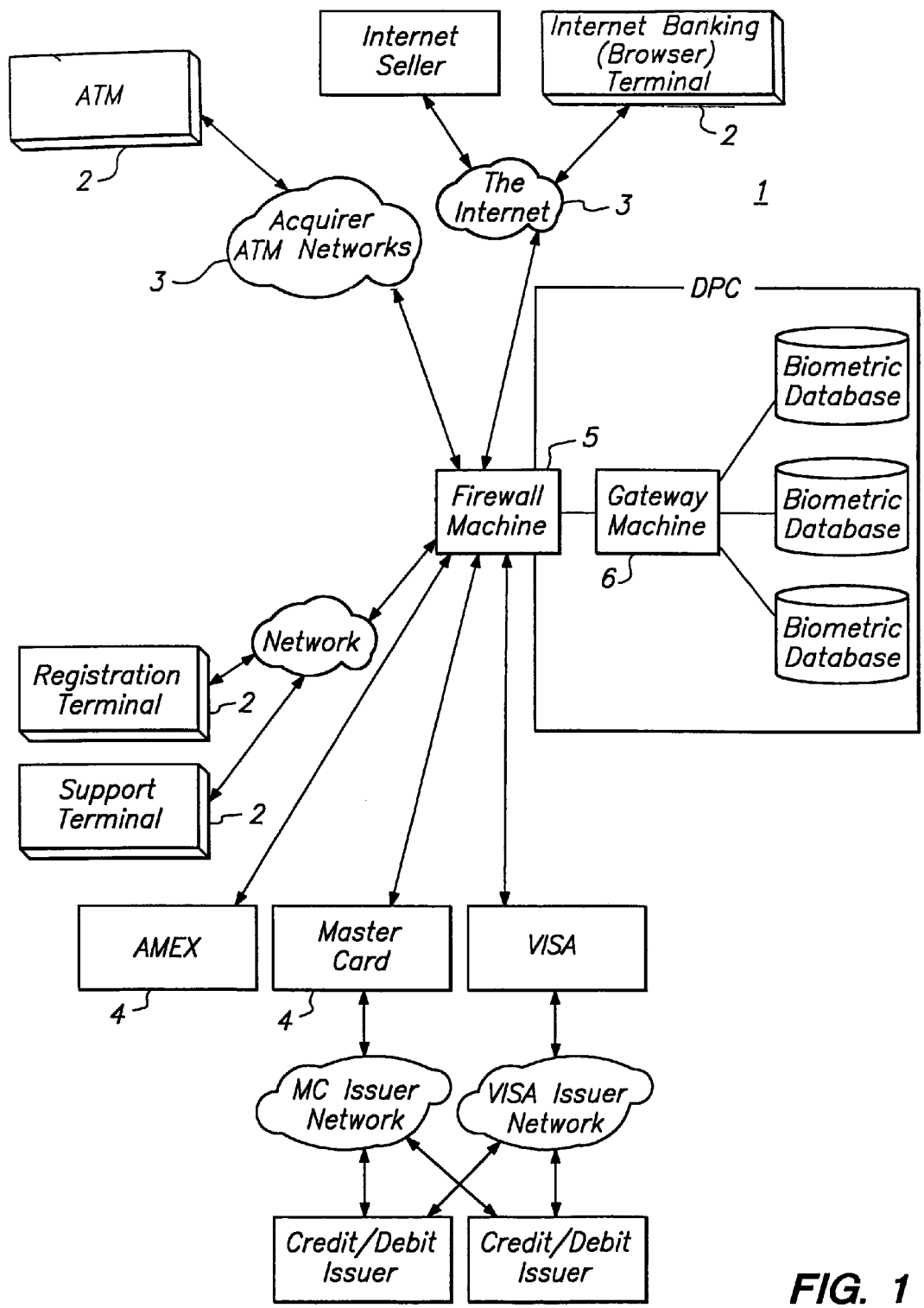
FIG. 1 is a diagram of the system of the present invention.
Figure 2:
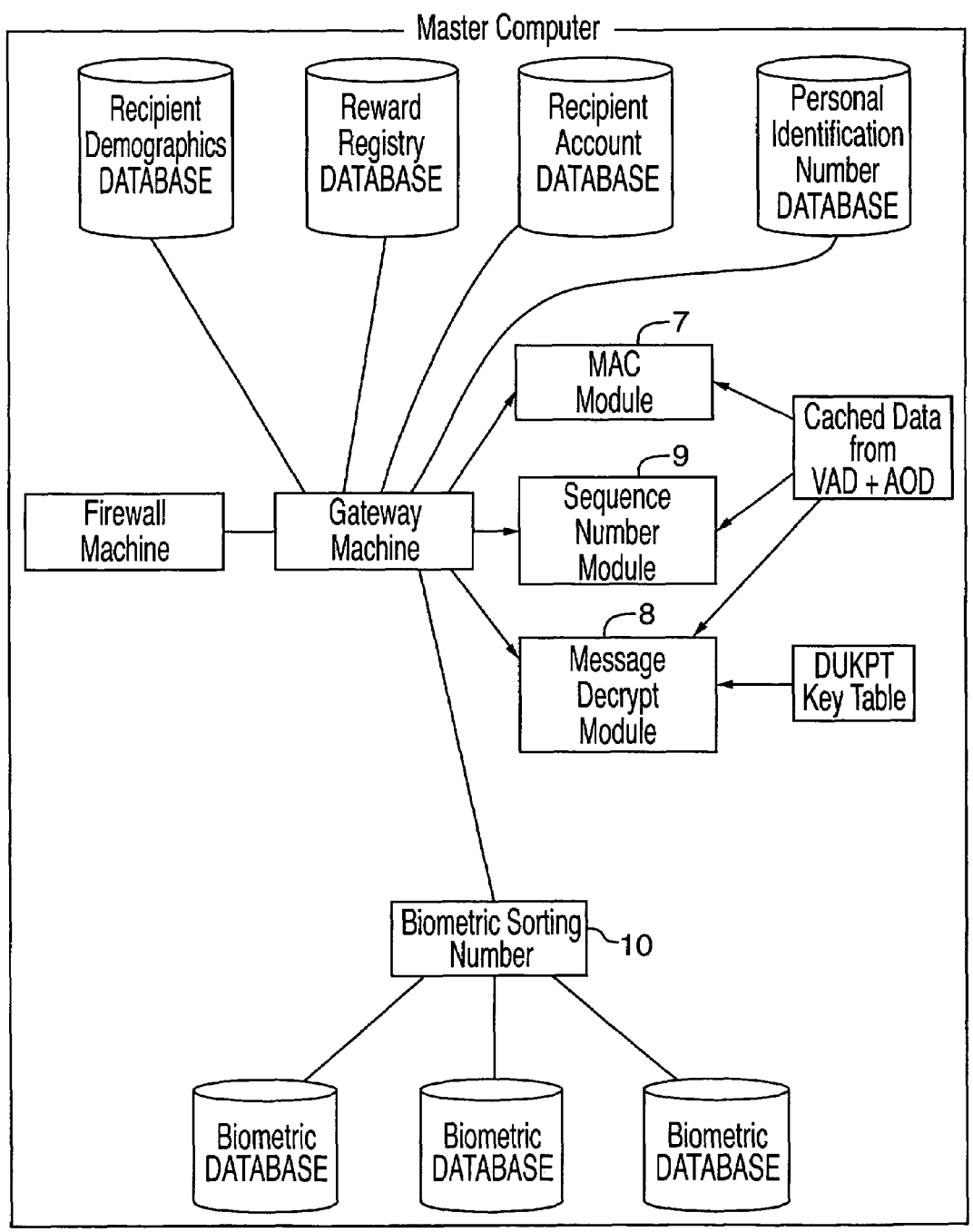
FIG. 2 is a diagram of an embodiment of the Data Processing Center (DPC), also referred to as the indenticator, and its internal databases and execution modules.
Figure 3:
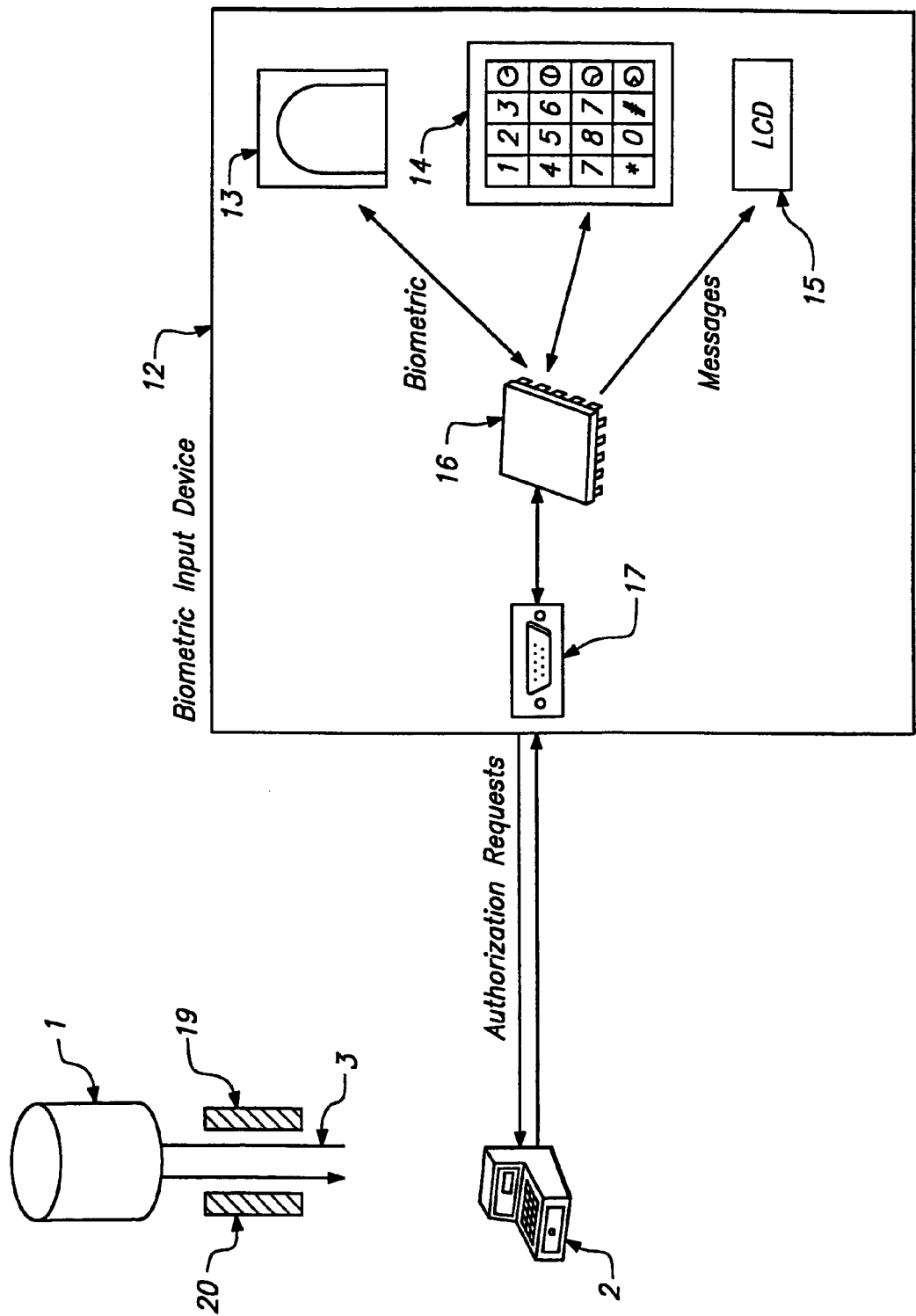
FIG. 3 is a diagram of a terminal, the biometric input apparatus and its components, and the interconnections between them.

Turning now to the figures, the overall configuration of an embodiment of the invention and its components are shown in FIG. 1. Essentially a Data Processing Center (DPC) 1 is connected to various terminals 2 through various types of communication means 3. The DPC is also connected and communicates with independent computer networks 4. In a preferred embodiment, the DPC contains several databases and software execution modules as shown in FIG. 2. In other embodiments of the invention, the databases are backed up or "mirrored" in distinct physical locations for safety reasons. The Firewall Machine 5 is responsible for prevention of electronic intrusion of the system while the Gateway Machine 6 is responsible for routing all requests from the user, including adding, deleting and otherwise modifying all databases. In a preferred embodiment, the Gateway Machine is also responsible for decryption and de-packaging of data that has arrived from the terminals using the MACM module 7, MDM module 8, and the SNM module 9. The BSN module 10 is used to locate the biometric data. Alternatively, in other embodiments, no BSN is used and the Gateway Machine's comparator compares bid biometric samples to all registered biometric samples in the system. FIG. 3 depicts an example of a terminal 2 and the biometric input device 12, which has a biometric scanner 13, data entry means such as a key pad 14, and a display panel 15.

The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the terminal through preferably a serial port 17. The terminal 2 communicates through a modem 18 with the DPC 1 through messages 19 and responses 20 using one of the interconnecting means in FIG. 1 such as a cable TV network, cellular telephone network, telephone network, the Internet, or an X.25 network, at the BIA.

Biometric Input Apparatus (BIA):

The BIA is a combination of hardware and software whose job is to gather, encode, and encrypt biometric data for use in identification of the users or recipient. Actions of the BIA are directed by an outside controlling entity called a terminal, which issues commands and receives results over the BIA's serial line.

BIA software can be tailored for various BIA hardware such as: personal computer (or "PC"), retail, registration, internal, issuer, and integrated remote. Each software load provides a different, use-specific command set. For instance, the registration software load does not accept requests to form retail transaction messages. Likewise, the retail software command set cannot send recipient registration messages. In a preferred embodiment, to provide another layer of security, the DPC knows what software package is loaded into each BIA; any attempts by a BIA to send a message that it is normally not able to send is rejected by the DPC and the event is treated as a major security violation.

In a preferred embodiment, each BIA has unique encryption codes that are known only to the DPC, and specific BIA embodiments are only allowed to perform operations limited to its designated function. Each biometric input apparatus has a hardware identification code previously registered with the DPC, which makes the biometric input apparatus uniquely identifiable to the DPC in each subsequent transmission from that biometric input apparatus.

Depending on the task at hand, BIA models are either partially or fully integrated with the terminal. Partially integrated devices are physically separate from the terminal, and they include wireless and retail point of sale BIAs. Fully integrated devices are contained within the physical enclosure of the terminal itself, for instance a telephone. It is preferred that the BIA never disclose any secret encryption codes to any external source.

The external interface to the BIA is much like a standard modem; commands are sent to it from a controlling terminal using the external serial line. When a command completes, a response code is sent from the BIA to the terminal. The particulars of the BIA software command interface detailed below illustrate one particular embodiment; other embodiments may mimic popular Key pad interfaces, such as magnetic stripe card readers.

All BIA data fields are preferably in printable ASCII, with fields separated by field separator control characters, and records separated by new lines. Encrypted fields are binary converted to 64-bit ASCII using the base-64 conversion library (all known in the industry).

Terminals

Terminals interface with BIAs and connect with the DPC via well known mechanisms for digital networking such as modem, X.25 packet network, telephone network, the Internet, a private intranet, or even a Cable TV network. In a different embodiment, terminals require different versions of the BIA to perform their tasks. Any electronic device that can issue commands to and receive results from the biometric input device is considered to be a terminal.

Some terminals are application programs that run on a general-purpose microcomputer, while other terminals are combinations of special-purpose hardware and software as show in FIG. 1. In a preferred embodiment, whenever a terminal provides information to the system, the system validates the terminal in some manner, either through presentation to the recipient for confirmation, or by cross-checking through other previously registered information.

While terminals are able to read some parts of BIA messages to validate that the data was processed properly by the BIA, terminals cannot read biometric identification information including the biometric data, encryption keys, or any account index codes.

It is understood that there are many different types of terminals could be employed depending on their location and manner of use; for example cable-TV point of sale terminal, Phone point of sale terminal, retail point of sale terminal and the like; which each is connected to a specific model BIA.

System Description: Data Processing Center

The Data Processing Center (DPC), also known as the identicator, handles recipient registration, recipient identification electronic rewards transactions, and in some cases: reward provider identification, and registration of reward providers. Each DPC site is made up of a number of computers and databases connected together over a LAN as illustrated in FIG. 2. In preferred embodiments, multiple identical DPC sites are employed to ensure reliable service in the face of disaster or serious hardware failure at any single DPC site.

DPC components fall into three categories: hardware, software, and databases. A preferred embodiment of the invention contains the following;

Hardware
  FW
  Firewall Machine: the entry point of the DPC site.
  GM
  Gateway Machine: the system coordinator and message processor.
  DPCLAN
  DPC Local Area Network: connects the DPC sites.

Databases
  IBD
  Individual Biometric Database: identifies recipients either from their biometric data and a BSN or only from biometric data.
  PFD
  Prior Fraud Database: lists recipients who have defrauded the system and can check if a biometric matches any of these recipients.
  VAD
  Valid Apparatus Database: stores information required to validate and decrypt BIA messages.
  AOD
  Apparatus Owner Database: stores information about the owners of BIA devices.
  ID
  Issuer Database: identifies issuing retailers that participate with the system.
  AID
  Authorized Individual Database: stores the list of people allowed to use personal or issuer BIA devices.
  RSD
  Remote Reward provider Database: stores information necessary to process transactions with telephone and cable television reward providers.
  RDD
  Recipient Demographics Database: Stores information related to specific characteristics of individual users such as gender, age, etc.
  RRD
  Reward Registry Database: Stores information related to rewards that are to be disbursed to users, their amount, and predetermined conditions for disbursement.
  RAD
  Recipient Account Database: Stores information related to the assignment of one or more account numbers to users for accounting accumulation of rewards by a user.
  PIN
  Personal Identification Number: In embodiments which require a user to submit a personal identification number for security reasons only, this database stores information regarding the personal identification numbers of users.

Software
  MPM
  Message Processing Module: handles the processing of each message by coordinating with the other software modules and databases required to perform the message's task.
  SNM
  Sequence Number Module: handles DUKPT sequence number processing.
  MACM
  Message Authentication Code Module: handles MAC validation and generation.
  MDM
  Message Decrypt Module: handles encrypting and decrypting of BIA requests and responses.
  BGL
  IBD Machine List: handles the lookup of the main and backup database machines dedicated to holding IBD records for a given biometric group.
  IML
  IBD Machine List: handles the lookup of the main and backup database machines dedicated to holding IBD records for a given biometric group.
  BSN
  Biometric Sorting Number: The BSN is a number that is derived using several possible methods in order to compartmentalize the registered biometrics of users in algorithmically dissimilar groups.

When describing database storage requirements, the term "expected" means the expected condition of a fully loaded system. Terminals send identification and transaction request messages to a DPC site. The DPC site sends back a response packet containing the status of a successful or failed operation.

The request message contains a BIA message part and a terminal message part:
  BIA message part
    protocol version number
    message type
    4-byte BIA Identification
    4-byte sequence number
    <message specific data>
    Message Authentication Code (MAC)
  Terminal message part
    <terminal specific data>

The BIA message part is constructed by a BIA device. It includes biometrics data, authorization amounts, and the contents of the general registers which are set by the terminal. The MAC in the BIA message part only applies to the BIA part and not to the terminal part.

A terminal may place additional data for the message in the terminal message part. The BIA provides a message key to allow the terminal to secure the terminal part data. The BIA automatically includes the message key in the packet's encrypted biometric block when necessary. However, the terminal performs the message key encryption itself, however.

The response packet contains a standard header and two optional free-form message parts: one with a MAC and one without:

Standard Header
   protocol version number
   message type
   <message specific data>
   MAC
   Optional Free-form message part without MAC
   <additional message specific data>

In a preferred embodiment, the message part of the response packet with a MAC is sent to the BIA so that it may validate that this part of the response has not been tampered with. The message part of the response packet without a MAC is used for transmitting large amounts of data that are not sent to the BIA for MAC validation as the BIA to terminal connection may be of limited bandwidth.

In an embodiment of the invention with multiple DPC sites, a terminal need only send its message to one of the DPC sites, typically the physically closest, because that site automatically handles updating the others by running distributed transactions as necessary.

When one of the DPC's Firewall Machines receives a packet, it forwards it to one of the GM Machines for actual processing. Each GM has a Message Processing Module that handles the coordination between the DPC components required to process the message and sends the response back to the sender.

All packets the DPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

Each packet the DPC receives may contain an optional response key stored in the encrypted biometric block of the packet. Before the DPC replies to a message that includes a response key, it encrypts the response packet with the response key. It also generates a Message Authentication Code and appends it to the packet.

DPC Procedures

Figure 4:
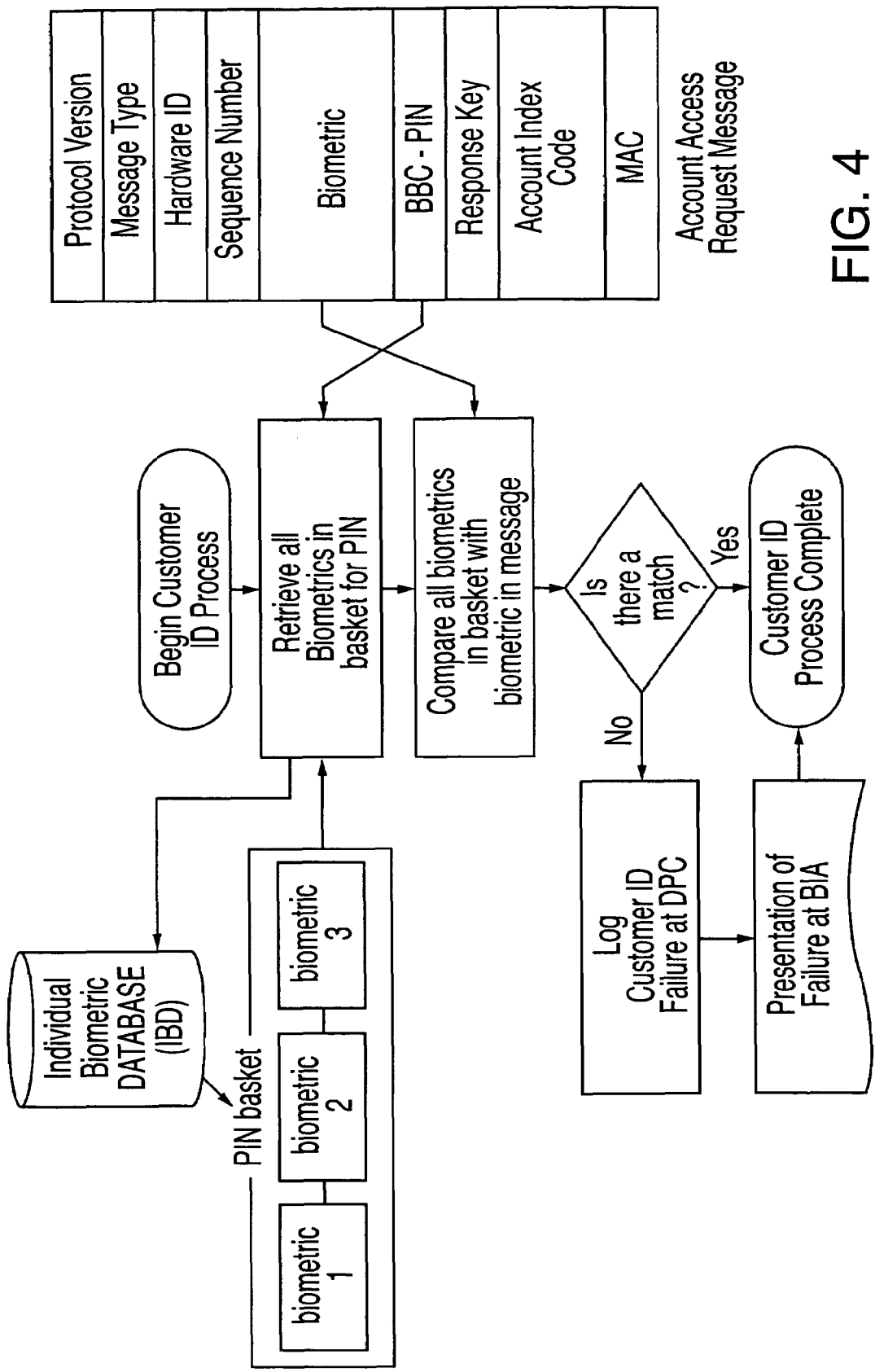
FIG. 4 is a flow chart of the preferred steps taken by the DPC during identification of a recipient user.
Figure 5:
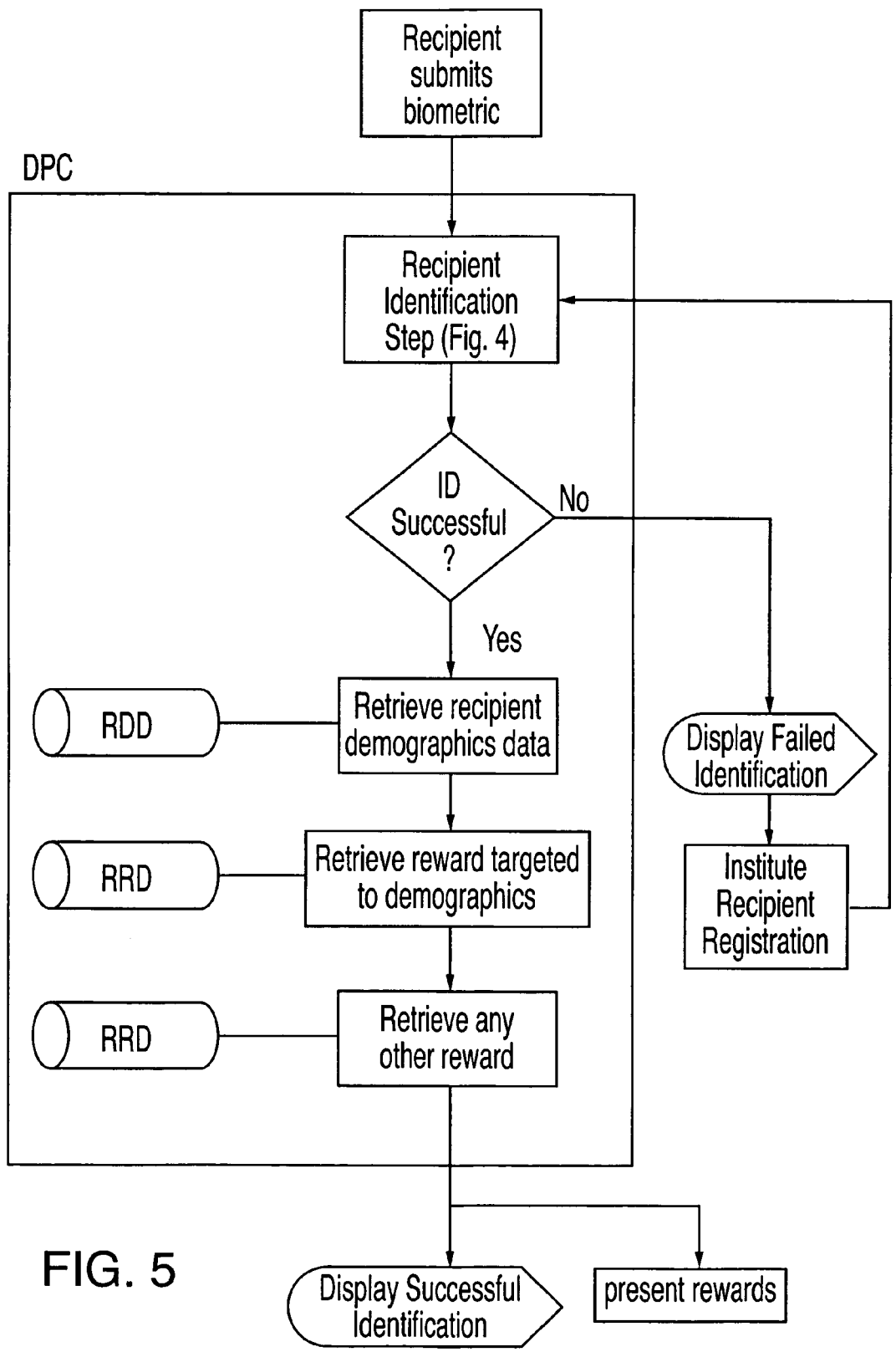
FIGS. 5 and 6 show representational diagrams of the steps taken during the authorization of issuance of a reward by the reward provider.
Figure 6:
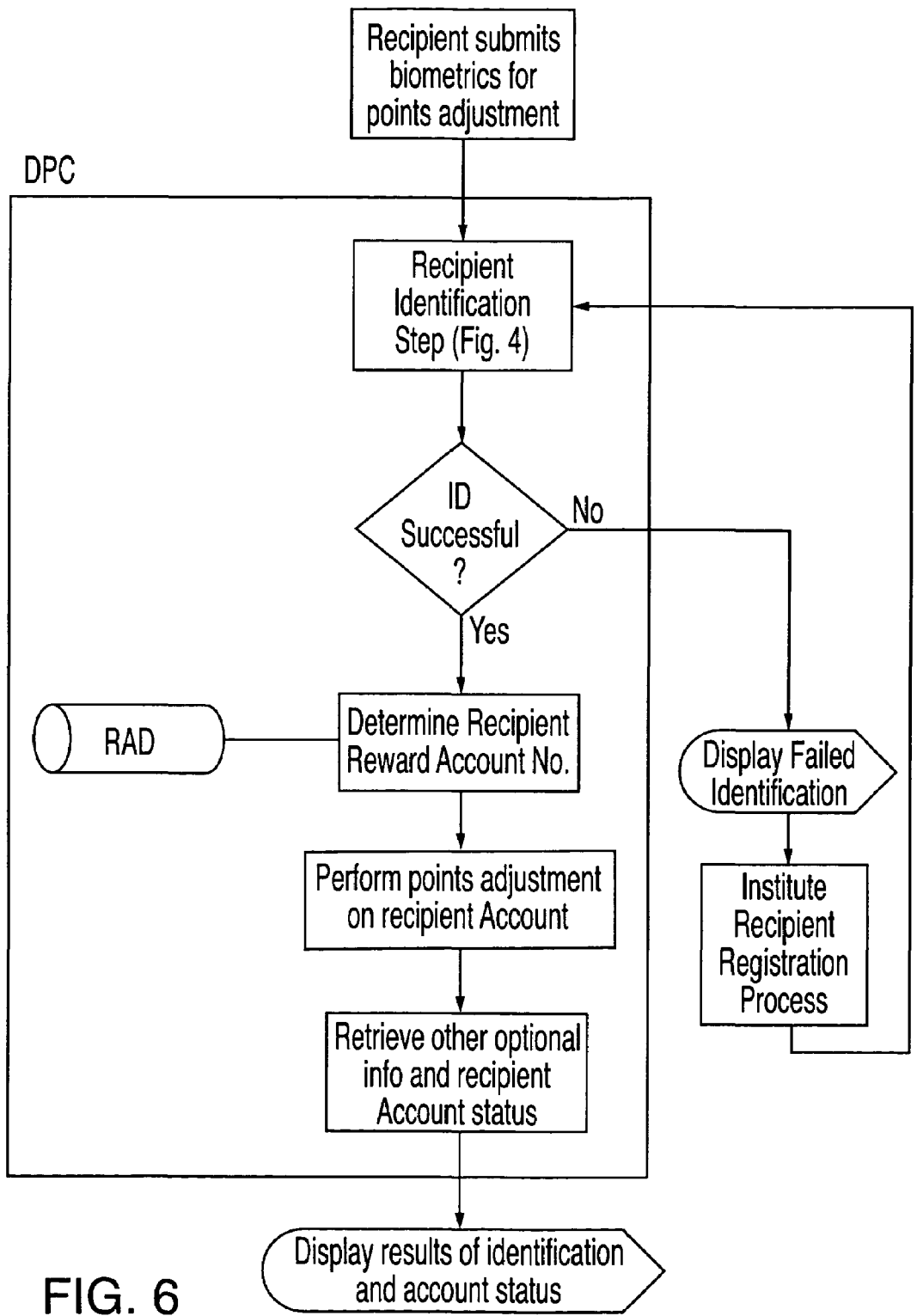
Figure 7A:
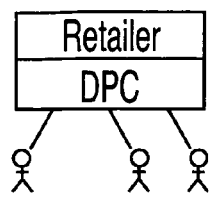
FIGS. 7a, 7b, 7c and 7d show various configurations of the DPC in relation to reward providers, retailers or other rewards providers to individual users or recipients registered with the system.
Figure 7B:
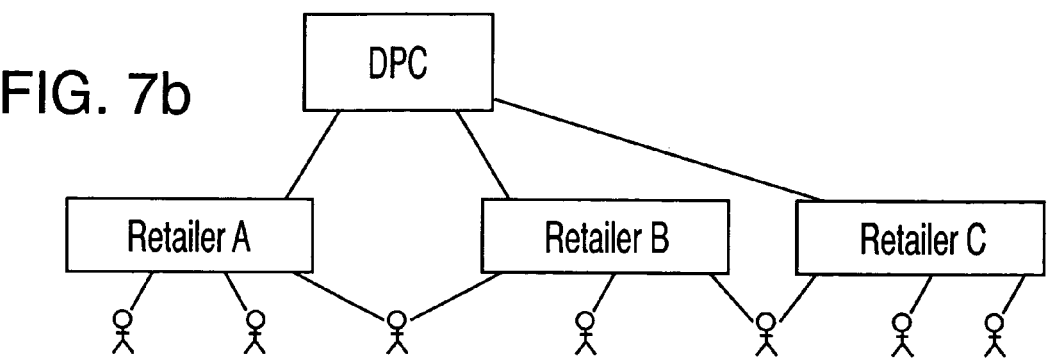
Figure 7C:
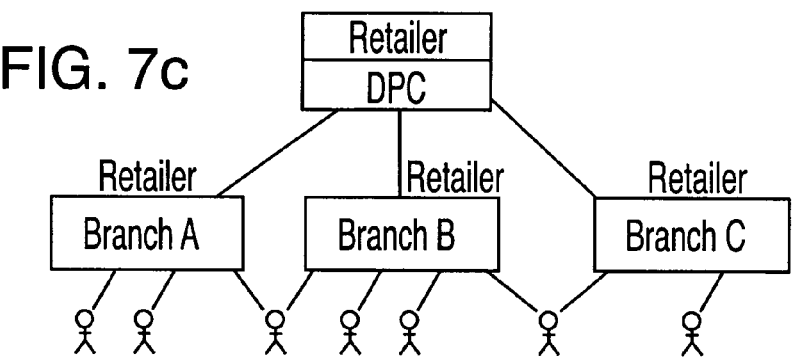
Figure 7D:
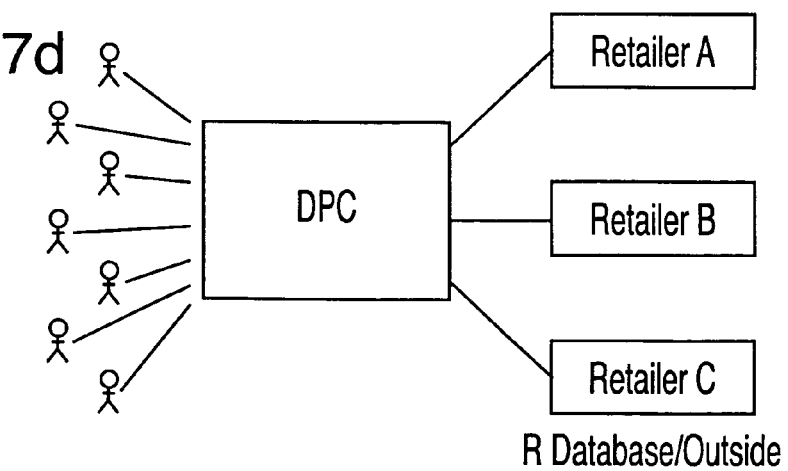

The DPC has several procedures commonly used while processing messages, which includes those shown in FIGS. 4, 5, and 6. FIG. 4. Is a representational diagram of identification of a user or individual recipient from the user's biometric data. According to one embodiment of the invention shown in FIG. 5, the recipient rewards registry is a registry of immediate cash discounts or rebates provided to recipient during a commercial transaction. In another embodiment shown in FIG. 6, the rewards registry is the accrual of points which are credited towards the future purchase of a product or service. In various embodiments the rewards within the reward registry database is tied to certain product purchases, certain purchasing patterns reflecting frequency or loyalty, or certain purchase dollar amounts.

The accrued rewards resultant from recipient's purchases are stored in the recipient's account, along with the recipient's corresponding demographic data and purchasing patterns. FIG. 7 shows various configurations of the DPC in relation to reward providers, retailers or other rewards providers to individual users or recipients registered with the system.

In another embodiment of the invention, the recipient selects a PIN which is used for security purposes such as those commonly used in today's commercial transactions. Alternatively, a PIN is used as a sorting mechanism to identify the biometric group where the user's biometric data resides in.

Alternatively, the rewards computer system searches previously stored biometric samples from individuals using at least two biometric baskets, and at least one biometric basket containing at least two algorithmically unique biometric samples from different individuals. Each biometric basket containing less than the total number of samples registered with the system, and each biometric basket identified by a recipient's personal identification number, also known as a "biometric basket code" (BBC).

The identicator DPC computer retrieves all the IBD records contained in the "basket" identified by the submitted bid personal identification number. The identicator DPC comparator then compares each biometric sample contained in the basket or group of the individual's bid biometric. Preferably, if no biometric has a close enough comparison score, the comparisons are repeated using the secondary biometrics. If none of the secondary biometrics have a close enough comparison score, then the computer comparator returns an "individual not found" error. Otherwise, the IBD machine returns the full IBD record of the individual, from which such fields such as account numbers, titles, and so on are accessed.

In another embodiment of the invention, the rewards computer system searches previously stored biometric samples using conversion of an image-enhanced digitized raster biometric sample, such as a fingerprint image, to vector lines in order to generate an identification value for the biometric sample. Any biometric can be used, such as a fingerprint, retina of the eye, iris of the eye, voice print, facial vascular patterns and the like. In the example of fingerprints, the raster image pixels are converted to vector lines along the fingerprint ridges and the vector lines are classified and converted according to type. The line types are then analyzed and a list of identification features corresponding to the vector line types is generated. The identification features between the vector lines types are compared and the image is classified according to fingerprint class. The computer system then generates a numerical encoding to classify the biometric sample's identifying features. This number is known herein as a biometric sorting number, or "BSN". The BSN may be a number shared by several registered biometrics which have similar principle biometric characteristics, or it may be a number containing one singular biometric.

In the case of fingerprints, the present fingerprint identification system ("FIS"), based on well-known research performed by Sir Edward Richard Henry and further by the United States Federal Bureau of Investigation, uses such main number classifications as arches, loops, and whorls. Therefore, all fingerprints with a similar loop pattern may be located within the same BSN. Subsequent to this initial search, the biometric will then have to be compared to all biometrics in that BSN in order to make a determination that the submitted biometric matches the correlated registration biometric. Alternatively, the computer may directly generate a BSN specifying that unique fingerprint and placing it in a file with no other biometrics. This BSN is generated directly by a more detailed analysis of the biometric sample's characteristics in order to determine that it is distinct from all previously registered biometrics, whether they reside in a BSN or whether they are in their own singular file. Such algorithmically-based biometric characteristic sorting and classification systems, using mathematical algorithms, are known in the art for fingerprints and for other biometrics such as retina of the eye, voice print, and face vascular patterns.

Figure 8:
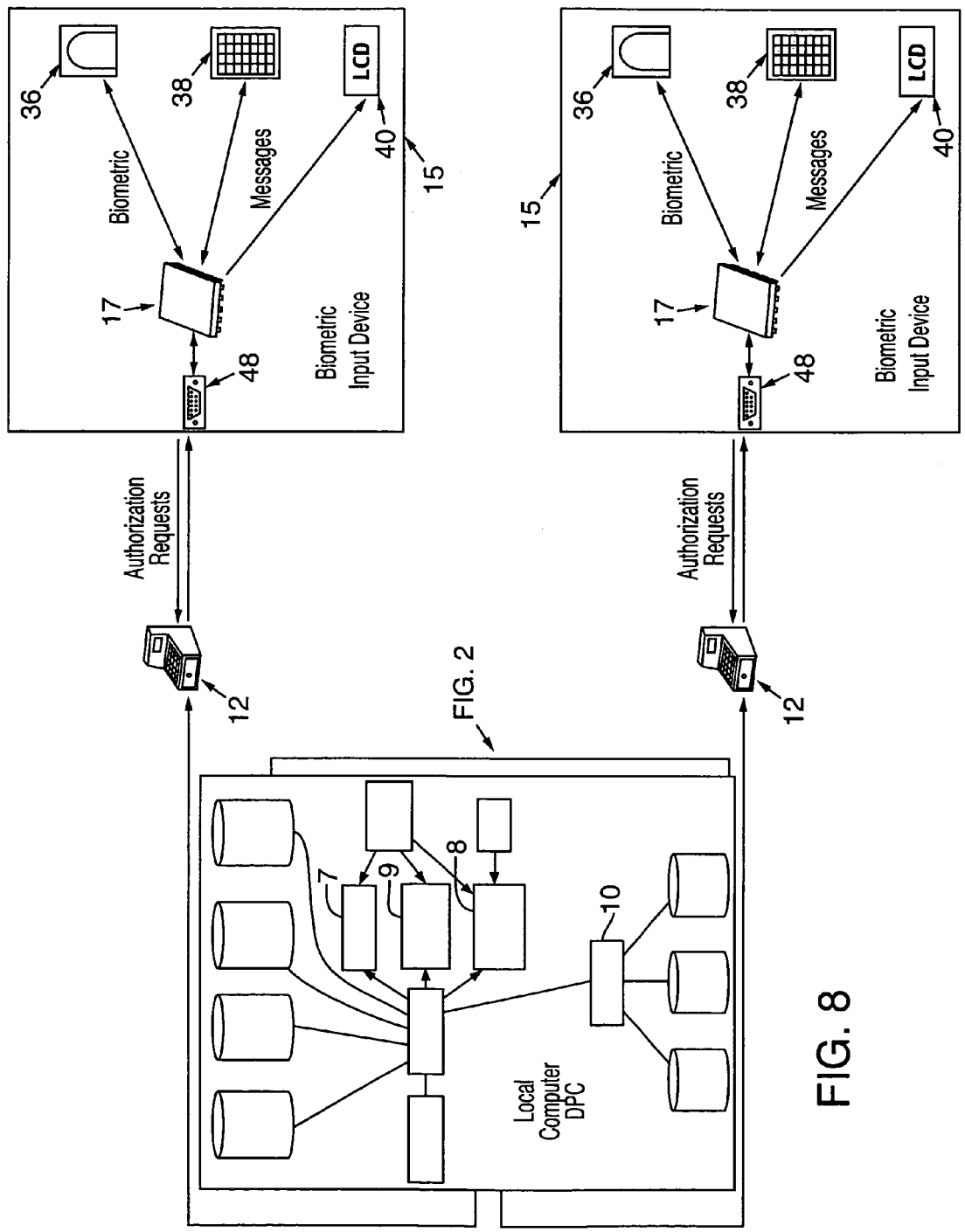

As shown in FIGS. 8 and 9, in other embodiments of the invention, the rewards computer system has a use-sensitive tokenless identification means for rapidly determining a recipient user's identity by performing a comparison of the recipient user's biometric with other recipient user biometric stored in a local computer which contains a subset of the total system's biometric samples. This method and device can be used for rapidly accessing and amending a recipient's rewards account. This system comprises at least two local computer systems and a master computer system. The master computer comparator further has a master user biometric database which contains or stores the biometric samples or rewards accounts of all users registered with the rewards transaction computer system. The computer system further comprises at least two local computers which are physically remote from each other. Each local computer further comprises a local user biometric database containing a subset of the biometric samples or rewards accounts contained in the master central database.

If upon submission of a bid biometric or a bid rewards account, a local computer returns a failed identification result, the bid biometric or rewards account is transmitted to the master computer for comparison of the entered bid biometric sample or rewards account to the biometric samples or rewards accounts stored in the master comparator for producing either a failed or successful second identification result. In another embodiment of the invention, the local computers are connected to each other by third interconnecting means such as an ATM network, the Internet, a private intranet, a telephone network, or a cable TV network. If a first local computer returns a failed identification result, in addition to or independent of the search of the master computer biometric sample or rewards database, the biometric sample or rewards database of a second local computer can also be searched, as the local computers' biometric sample or rewards account databases contain a subset of biometric samples or rewards accounts from the master computer and different sets of biometric samples or rewards accounts from each other.

Any combination of the above-mentioned search embodiments may be used to increase the identification or transaction process time, or decrease the likelihood of a false positive identification result.

For messages that require the DPC to identify a recipient using a BSN, the DPC uses a unique biometric identification value derived from the bid biometric data, to search the IBD Machine List for the main and backup IBD machines responsible for handling identifications for the given BSN code. Next, the DPC sends the identification message to either the main or backup machines depending on which is the least loaded. The IBD machine responds with the IBD record for the recipient or a "recipient not found" error message.

The IBD machine retrieves all the IBD records for the given BSN. The IBD machine then compares each IBD record's primary registered biometric sample with the recipient's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns a "recipient not found" error. Otherwise, the IBD machine returns the full IBD record of the recipient, from which such fields such as the private code, recipient reward account numbers, recipient or user demographics data, and so on may be obtained.

Protocol Messages

The following sections describe each protocol request message/response and the actions the DPC takes to perform them.

The list of protocol packets are:
  Recipient Identification
  Electronic rewards Transaction
  Registration
  Issuer Batch
  List Accounts Recipient Identification Message
BIA Part:
  4-byte BIA Identification
  4-byte sequence number
  encrypted(DUKPT key) Biometric block:
    300 byte authorization biometric
    112-bit response key
  MAC
Terminal Part: (not used)

Recipient Identification Response
  encrypted(response key):
    private code text
    recipient name
  status code (ok, failed, etc.)
  MAC The Recipient Identification message includes a biometric block which the DPC uses with the recipient identification procedure to identify the recipient. If the recipient is identified, then the DPC responds with the recipient's name, biometric identification, and private code. Otherwise, the DPC responds with an "unknown recipient" error.

Electronic Rewards Transaction Message
BIA Part:
  4-byte BIA Identification
  4-byte byte sequence number
  encrypted(DUKPT key) Biometric block:
    300-byte authorization biometric
    112-bit response key
    [optional 112-bit message key]
  rewards account index code
  price
  reward provider identification code
  transaction type
  [optional free-format product information]
  [optional reward provider identification channel (phone number, channel number+time, hostname)]
  [optional send-address request]
  MAC
Terminal Part: (not used)

Electronic Rewards Transaction Response
  encrypted(response key):
    private code text authorization response
authorization detail (authorization code, transaction identification, etc)
[optional recipient address information]
status code (OK or fail, silent alarm)
MAC There are two basic electronic rewards transaction subtypes: retail and remote. There are two basic rewards transaction types: debit and draft. Drafts tabulate purchasing based rewards that are subsequently cashed or used towards purchasing products or services by the recipient. No debit to the proposed commercial transaction occurs immediately. Many current rewards transactions are done via draft. In one embodiment, these steps are accomplished using a pair of ISO 8583 messages: an authorization message followed by a rewards transaction message.

Debit transactions result in immediate debit of money from the reward provider's proposed commercial pursuant to the recipient's rewards account. If the deduction to the reward provider's proposed commercial transaction occurs immediately, the system considers the transaction type to be debit, regardless of the rewards account type used as the source of funds, or which external computer system is used to move the money around.

The DPC identifies the recipient by the biometric block of the message. For instance, if the transaction type is a draft, the DPC constructs a credit authorization draft request and transmits it to the appropriate external computer system (e.g. VISANet, MAPP, etc.). The external computer system is responsible, in this embodiment, for performing the resource determination to see if the recipient can pay. If the external computer system approves the transaction, the DPC returns an "OK" response code to the BIA device, while a disapproval results in a "failed" code. The contents of the response message from the external computer system (called an "authorization request response", see ISO 8583) are added to the response as well along with the recipient's private code.

In an alternate embodiment, the accounts and their balances are stored at the DPC Ned: which database, which performs resource determination, draft generation or credit/debit instead of sending the transaction to an external computer system.

Remote authorization are generated by telephone, mail order, the Internet, or cable television reward providers. The DPC handles remote authorizations the same way it does a retail authorization but with the following modifications:

i) Remote authorizations include a remote reward provider identification code which the DPC checks against the Remote Reward provider Database to validate whether the reward provider identification matches the one stored in the database.

ii) The DPC checks the biometric Identification of the identified recipient against the Authorized Individual Database's list of recipients allowed to use the BIA device. If the recipient is not authorized to use the device, then the DPC denies the authorization request.

iii) In some embodiments, the authorization packet contains a "send-address" indicator. This indicator informs the DPC to include the recipient's address in the response packet and is usually used only for mail order purchases.

Use-Sensitive DPC Procedures

In another embodiment, the system may have use-sensitive data processing capabilities, wherein frequent users of the system are on a local cache. This system would comprise a master computer having a master computer comparison engine, also referred to as a comparator. The master computer comparator further has a master user biometric database which contains or stores the biometric samples of all users registered with the identification computer system. The master computer further comprises a user biometric group database which contains the BSNs of said users. BSNs of users may not necessarily be unique to the individual users, thus, more than one user can have the same BSN. The identification computer system further comprises at least two local computers and physically remote from each other. Each local computer further comprises a biometric scanner; a local comparator; a data entry device; and a local user biometric database containing a subset of the biometric samples contained in the master biometric database. First interconnecting means interconnects each local computer to the master computer.

When the user enters their bid biometric sample into a first local computer, the first local computer comparator compares the bid biometric sample against the subset of the registered biometric samples contained in the first local computer databases to produce either a failed or successful first identification result. If the first local computer returns a failed identification result, the bid biometric sample is transmitted to the master computer for comparison of the entered bid biometric sample to the biometric samples stored in the master computer for producing either a failed or successful second identification result. The result of the first or second identification result is externalized from the identification computer system to the user by at least one display unit.

Upon return of a failed first identification result and return of a successful second identification result, the master computer transmits the biometric sample of the identified user to the first local computer. Therefore, in future bid biometric samples presented by the same individual, only the biometric sample database of the first local computer need be searched.

In another embodiment of the invention the identification computer system further comprises a purge engine for deleting biometric samples and BSNs from the central computer and local computer databases. In order to store only biometric samples from those individuals who use the system more often and prevent the overload of biometric sample databases with biometric samples from individuals who do not use the system often or use the local computers sparsely, the biometric sample of a user is deleted from the local computer biometric databases if there has been no attempt to identify an individual upon expiration of a predetermined time limit.

The local computers further comprise at least one terminal apparatus that is functionally partially or fully integrated with the biometric scanner; at least one key pad; and second interconnecting means for interconnecting the biometric scanner, terminal apparatus and the key pad.

In order to make communications between the master computer and the local computers more safe, the identification computer system further comprises encryption and decryption means, wherein communications between the master computer and local computer are encrypted.

Master, Intermediary and Local DPCs

The master DPC which is also referred to as the identicator system, is responsible for storage of the entire set of biometric samples registered with the computer system.

Each master DPC site is preferably made up of a number of computers and databases connected together over a LAN (known in the industry) as illustrated in the master computer overview FIG. 2. Multiple identical master computer sites ensure reliable service in the face of disaster or serious hardware failure at any single central computer site. Furthermore, each master, intermediary, and local computer site has electrical power backup and multiple redundancy in all of its critical hardware and database systems.

It is preferred that the master and intermediary computers have a firewall machine which is the entry point of data and messages into these computers, and a gateway machine which is a system coordinator and message processor.

Comparator

For requests that require the master, intermediary, or local DPCs or computer systems to identify an individual, each of the indicated computers searches the individual biometric database using the identicator system comparator.

The computer retrieves all the IBD records for the submitted bid personal identification number. The comparator then compares each biometric sample contained in the individual's bid biometric. Preferably, if no biometric has a close enough comparison score, the comparisons are repeated using the secondary biometrics. If none of the secondary biometrics have a close enough comparison score, then the computer comparator returns an "individual not found" error. Otherwise, the IBD machine returns the full IBD record of the individual, from which such fields such as the private code, account numbers, titles, and so on are accessed.

Master Computer LAN

The master computer Local Area Network (LAN) links the machines of the master computer sites together using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Registration
Registration Message
BIA Part:
    4 byte BIA Identification
    4 byte sequence number
    encrypted(DUKPT key) Biometric block:
        1000-byte primary registration biometric
        1000-byte secondary registration biometric
        112-bit response key
        112-bit message key
    MAC
Terminal Part:
    encrypted(message key):
        name
        address
        zipcode
        private code
        rewards account list (account index code, rewards account #)
Registration Response
    encrypted(response key):
        private code text
        list of DPC chosen BSNs
        status code (OK, failed, etc)
    MAC Recipients register with the DPC via a Recipient Registration Terminal (BRT). The BRT sends the DPC a registration packet containing primary and secondary biometrics, along with ancillary data such as the recipient's name, address, a list of rewards accounts, and any the private code. Optionally, the recipient may include a Social Security Number (or "SSN"). In a modification step any previously entered data can be modified or deleted.

At any given moment, only one DPC site acts as the registration site, for implementation simplicity. Registration messages received by non-registration DPC sites are forwarded to the current registration site. The registration DPC site performs the entire registration check, assigning of IBD records to IBD machines, and the distributed transaction required to update all other DPC sites.

The registration DPC site selects the BSN for registration messages, stores the IBD record on the main and backup IBD machines (as specified in the BSN Group List), and checks the BSN and the biometric suitability of the registration packet before running the distributed transaction to update the other DPC sites.

The DPC runs a BSN and biometric sample duplication check step wherein the biometric and BSN from the registration step is checked against all previously registered biometrics currently associated with the identical BSN. The DPC may reject the registration for the following reasons: the biometrics are confusingly similar to another biometric, thereby generating a BSN that is already assigned. Alternatively, the biometrics may be too similar to other biometrics stored under the BIV chosen by the computer system, resulting in an unacceptable false accept rate or false reject rate.

Issuer Batch
Issuer Batch Message
BIA Part:
    4-byte BIA Identification
    4-byte sequence number
    encrypted(DUKPT key) Biometric block:
        300-byte authorization biometric
        112-bit response key
        112-bit message key
    issuer code
    MAC
Terminal Part:
    encrypted(message key)
        add <biometric Id><rewards account index code><rewards accountremove
        <biometric Id><rewards account index code><rewards account>
Issuer Batch Response
    encrypted(response key):
        private code text
    status code (OK, failed, etc.)
    MAC
    encrypted(message key) failed list:
        failed <command><code>

The Issuer Batch message allows an issuing retailer or other authority to perform routine maintenance on the Individual Biometric Database. The DPC logs a security violation warning if it receives any Issuer Batch messages from non-issuer BIA devices, and it also refuses to process the message.

The DPC identifies the employee submitting the batch message by following the recipient identification procedure. The DPC then checks that the employee is registered in the Authorized Individual Database to use the BIA device embedded in the sending Issuer Terminal.

The DPC also uses the issuer code in the message to look up the apparatus owner Identification in the Issuer Database and compare it against the apparatus owner Identification stored in the Valid Apparatus Database to ensure that the issuer code is not forged.

The DPC then executes the add and delete commands in the message-key encrypted batch list. The batch list is a newline separated list of commands. Valid commands are:

add <biometric Id><rewards account index code><rewards account>

The add command adds the rewards account to the rewards account list at the specified rewards account index code. If the rewards account currently stored in the rewards account list does not belong to the issuer, the command fails. This feature prevents one retailer from adding or removing rewards accounts from other retailer's customers without the recipient's knowledge or authorization.

remove <biometric Id><rewards account index code><rewards account>

The remove command clears the recipient's rewards account stored at the specified rewards account index code in the rewards account list. If the rewards account currently stored in the rewards account list does not match the rewards account the issuer is attempting to remove, the command fails.

For each command in the batch that failed to execute correctly, the GM logs a security violation warning and appends an entry to the failed list of the response. The failed entry includes the text for the command and the error code.

List Accounts
List Accounts Message
BIA Part:
    4-byte BIA Identification
    4-byte sequence number
    encrypted(DUKPTkey) Biometric block:
        300-byte authorization biometric
        112-bit response key
    MAC
Terminal Part: (not used)
List Accounts Response
    encrypted(response key):
        private code text
        list of (account name, account index code)
    status code (OK, failed, etc.)
    MAC The list accounts message allows recipients to determine which rewards accounts match particular rewards account index codes. This is useful when recipients forget which rewards accounts and index codes are available.

The GM identifies the recipient by the packet's biometric and retrieves the appropriate information from the recipient's record.

Firewall Machine

The FW Machines provide a first line of defense against network viruses and computer hackers. All communication links into or out of the DPC site first pass through a secure FW Machine. Preferably, the FW Machine, an Internet-localnet router, only handles messages destined for the GM Machines. BIA-equipped terminals send packets to a single DPC site via modem. X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets. A properly configured network sniffer acts as an intruder detector as backup for the FW. If an anomalous message is detected, the intruding messages are recorded in their entirety, an operator is alerted, and the FW is physically shut down by the sniffer.

The FW disallows any transmissions from the internal network to the rest of the Internet. An electronic rewards transaction message requires about 400 bytes and registration packets require about 2 KB. To handle 1000 electronic rewards transactions per second and 1 registration packet per second, the FW Machines are able to process about 400 KB per second.

Gateway Machine

The GM Machine (GM), through the FW Machines, link the outside world (BIA-equipped terminals and other DPCs) to the internal components of the DPC. Preferably, the DPC has multiple GMs.

The GM supervises the processing of each BIA message, communicates with the various DPC components as necessary, and sends any encrypted results of the message back to the sender. The software performing this task is called the Message Processing Module. Preferably, the GM logs all messages it receives and any warnings from components it communicates with. For example, the GM logs any silent alarms, sequence number gaps, and invalid packets. Processing a message may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the message regardless of whether the distributed transaction commits or not. Asynchronous distributed transactions are only used to update data for which database consistency is not an absolute requirement: sequence numbers and biometric checksum recordings may be performed asynchronously, whereas creating database records, such as Recipient Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Messages that require a synchronous distributed transaction cannot be performed until network connectivity is restored or the site is removed from the valid site list. Before a site can be added back to the valid site list, the system administrator brings the site's databases up to date with those of a currently active site.

Each GM runs the following software components locally for performance reasons:
- Message Processing Module
- Message Authentication Code Module
- Message Decrypt Module
- Individual Biometric Database Machine List The message bandwidth required by the GMs is similar to that required by the FW Machines. A FDDI network interface provides 100 MBits per second and easily covers any bandwidth requirements.

DPC LAN

The DPC Local Area Network (LAN) links the machines of the DPC sites together using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware. The master computer Local Area Network (LAN) links the machines of the master computer sites together using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Message Processing Module

The Message Processing Module (MPM) handles the processing for a message. It communicates with other components of the DPC as necessary to perform its tasks. The presence of an MPM on a machine brands it as a GM.

The MPM maintains a message context for each message it is currently processing. The message context includes the information necessary to maintain the network connection to the terminal making the message, the BIA device information, the response key, and the response packet.

Message Authentication Code Module

The Message Authentication Code Module's (MACM) tasks are to validate the Message Authentication Code on inbound packets and to add a Message Authentication Code to outbound packets.

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a reward provider identification code, the MACM also checks the reward provider identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

Message Decrypt Module

The Message Decrypt Module's (MDM) task is to reconstruct the DUKPT transaction key and with it decrypt the biometric block of the packet. It maintains a list of the DUKPT Base Keys that are required to generate the transaction key.

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

Biometric Group List

In embodiments employing the BSN or BBC, the Biometric Group List (BGL), in conjunction with the Individual Biometric Database Machine List, defines the configuration of the IBD machines. The BGL stores a list of the BSNs or BBCs in the system which is used to simplify the management of the biometrics. A BGL exists on each GM Machine (GM).

The BGL, when given a BSN, searches through its list of biometric groups for the group containing the BSN. The BGL maintains the list of groups in order and uses a binary search to quickly find the correct group. The initial configuration for the BGL is one single biometric group containing all possible biometrics. After a threshold number of BSNs are assigned, the giant biometric group is split in two. Thereafter, this process is applied to all succeeding biometric groups.

When a biometric group splits, the BGL assigns a new main and backup IBD machine based on available storage on a first-come-first serve basis. The BGL coordinates with the IBD machines to first copy the affected records from the old main and backup machines to the new ones, update the IML record, and last remove the old main and backup copies. Splitting a biometric group is an involved task. The BGL batches split requests to be run when the DPC is lightly loaded.

The system administrator may also change the main and backup IBD machines for a given biometric group if the machines' free storage falls below a level required for handling the expected amount of new registrations.

Individual Biometric Database Machine List

The IBD Machine List (IML), in conjunction with the Biometric Group List, codifies the configuration of the IBD machines. The IML maps a biometric value to the main and backup IBD machines storing IBD records for the biometric. The IML is actually keyed by Biometric Group (a set of consecutive biometric values). An IML exists on each GM Machine (GM).

When a GM processes a message that requires a biometric identification, the GM finds the IML record keyed by the biometric group. The GM then knows the main and backup IBD machines to use for the biometric identification.

Most IBD records will be recipients, who will use the system to purchase products from reward providers at points of sale. The rest of the records will be generally associated with people who perform administrative functions such as registration, or customer support.

Sequence Number Module

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers. When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

In another embodiment, to thwart resubmission attacks completely, only one SNM validate packets. Under this scheme, there is no update transmission delay window to exploit with a resubmission attack. Alternately, multiple SNMs can be active at the same time provided none of them handle sequence number validation for the same BIA-equipped device.

Sequence Number Maintenance

When the SNM boots up, it loads the sequence number hash table from the sequence numbers for active BIA stored in the VAD.

The VAD is responsible for sending add-entry and remove-entry messages to the SNMs for any BIA-equipped devices that are activated or deactivated to keep the SNM hash table up-to-date.

Apparatus Owner Database

The Apparatus Owner Database (AOD) stores information on recipients or organizations that own one or more BIA-equipped devices. This information is used to double check that the BIA devices are used only by their rightful owners, to provide rewards account information for proposed commercial transactions, and to allow identification of all BIAs owned by a specific recipient or organization.

Most BIA devices will be owned by reward providers, i.e. reward providers engaged in selling to recipients wishing to buy products.

Each AOD record includes a rewards account to credit or debit the owner when the DPC processes a rewards transaction submitted by one of the owner's BIA-quipped devices.

Valid Apparatus Database

The Valid Apparatus Database (VAD) is a collection of records representing all of the BIAs that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Messages from that BIA are accepted by the DPC.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed messages, recent messages, and the average number of messages performed by a given apparatus are recorded in the VAD record, to assist the security factors module in detecting fraudulent messages. Periodically, the recentReqs and the failedReqs fields are cleared.

Individual Biometric Database

Individual Biometric Database (IBD) records store personal information on recipients for both identification as well as authentication. This information may include their primary and secondary biometrics, one or more biometric values, a list of rewards accounts, perhaps a rewards account index code, account index names, private code, address, and phone number. The recipient may optionally include this SSN. This information is necessary for identifying a recipient either by biometric or personal information, for accessing related information, or for providing an address or phone number to remote reward providers for additional verification.

Recipients are added to the system during the recipient enrollment process at registered Recipient Registration Terminals located in retail establishments worldwide, or in local system offices. During enrollment, recipients add rewards accounts to their biometric and biometric sorting number combination.

Recipients may be removed from the database due to fraudulent activity reported by any issuing member. If this occurs, the recipient's record is moved from the IBD to the Prior Fraud Database (PFD) by an authorized internal systems representative. The biometric Ids for records in the PFD may not be used for records in the IBD.

The IBD exists on multiple machines, each of which is responsible for a subset of the IBD records with a copy of each record stored on two different machines, both for redundancy and for load-sharing. The IBD Machine List, stored on the GM, maintains which machines hold which biometric values.

Recipient Demographics Database

Stores information related to specific characteristics of individual users such as gender, age, etc.

Rewards Registry Database

Stores information related to rewards that are to be disbursed to users, their amount, and predetermined conditions for disbursement.

Recipient Account Database

Stores information related to the assignment of one or more account numbers to users for accounting accumulation of rewards by a user.

PIN Database

In embodiments which require a user to submit a personal identification number for security reasons only, this database stores information regarding the personal identification numbers of users.

Authorized Individual Database

For each issuer or personal BIA-equipped device, the Authorized Individual Database (AID) maintains a list of recipients who are authorized, by the owner of the device, to use it.

The AID exists for two reasons. The first is that it provides restricted access to a terminal. For example, the Issuer Terminal can only be used by an authorized retailer representative. The second reason for the AID is to prevent criminals from secretly replacing the BIA in a retail point of sale terminal with that of a personal BIA from a phone Terminal and thus routing all purchases to a remote rewards account set up by the criminals.

Prior Fraud Database

The Prior Fraud Database (PFD) is a collection of records representing recipients who have defrauded member issuers at some point in the past. This database allows the DPC to perform a re-registration check on every new registrant quickly, since only a small number of recipients will be designated as having defrauded member issuers. The PFD also runs background transactions during periods of low system activity to weed out recipients in the IBD who have matching records in the PFD.

The system does not automatically put recipients in the PFD, unless it detects that they are attempting to register again. Placing a recipient in the PFD is a sensitive policy matter which is outside the scope of this document.

Before a new IBD record is marked as active, the recipient's primary and secondary biometrics are checked against each and every biometric in the PFD using the same biometric comparison techniques as those used in the recipient identification procedure. If a match is found for the new IBD record, the IBD record's status is designated with a label of "prior fraud", and the GM logs a "registering recipient with prior fraud" warning.

It is assumed that the PFD will remain relatively small. The cost to run the PFD is expensive, as it is an involuntary biometric search, so it is important to add only those recipients to the PFD who have imposed a significant cost to the system.

Issuer Database

The Issuer Database (ID) stores information on retailers and other institutions that allow their rewards accounts to be accessed through the system. For many rewards accounts, the issuing institutions are the only entities that can add or remove their rewards account numbers to a given recipient's IBD record.

The DPC uses the ID to validate messages from Issuer Terminals by searching the ID for a record containing the Issuer Terminal's issuer code. The owner Identification stored in the record must match up with the owner stored in the Valid Apparatus Database for the BIA stored in the Issuer Terminal.

Remote Reward Provider Database

The Remote Reward provider Database (RSD) stores information on reward providers that provide goods or services over telephones, cable television networks, or the Internet. Each order sent by a recipient using a properly-equipped terminal is routed through the reward provider's order terminal to the system.

Once a recipient's remote electronic rewards transaction is received and the MAC validated by the DPC, the reward provider identification code is compared against the reward provider identification code in the RSD. The reward provider identification code, be it phone number, reward provider-product credential, or Internet address, exists in the RSD record under the correct reward provider identification code or the DPC terminates the message and returns an invalid reward provider identification code error to the sending BIA terminal device.

In GM:
1. MACM checks the MAC (local)
2. SNM checks the sequence number (network message)
3. MDM decrypts the biometric block (local)

4. Find IBD machine (local)
5. Send identify message to the IBD machine (network message)

In IBD machine:
6. Retrieve all IBD records for the Biometric Value (x seeks and x reads, where x is the number of pages required to store the biometric records).
7. For each record, compare against its primary biometric (y/2 ms where y is the number of records retrieved).
8. If no reasonable match, repeat step 9 but compare against the secondary biometric (z*y/2 ms, where y is the number of records retrieved and z is the probability no match is found).
9. Update the best matching IBD record's checksum queue and check for possible replay attacks (1 seek, 1 read, and 1 write).
10. Return the best matching IBD record or an error if the match is not close enough (network message).

In GM:
11. Authorize message with an external processor (network message)
12. GM encrypts and MACs the response (local).
13. Sends response packet back (network message).

From the foregoing, it will be appreciated how the objects and features of the invention are met. First, the invention provides a computer identification system that eliminates the need for a user to possess and present a physical object, such as a token, in order to authorize a transaction. Second, the invention provides a computer identification system that is capable of verifying a user's identity, as opposed to verifying possession of proprietary objects and information. Third, the invention verifies the user's identity based upon one or more unique characteristics physically personal to the user. Fourth, the invention provides an identification system that is practical, convenient, and easy use. Fifth, the invention provides a system of secured access to a computer system that is highly resistant to fraudulent transaction authorization attempts by non-authorized users.

Although the invention has been described with respect to a particular tokenless identification system and method for its use, it will be appreciated that various modifications of the apparatus and method are possible without departing from the invention, which is defined by the claims set forth below.

AID:
Authorized Individual Database: contains the list of individuals authorized to use personal and issuer BIA devices.

AOD:
Apparatus Owner Database: central repository containing the geographic and contact information on the owner of each BIA.

Reward Provider:
A person or entity that proposes transactions or rewards to recipients, generally for the purpose of selling goods and services recipients.

BBC:
Biometric Basket Code: a personal identification number which may accompany the user's bid biometric in order to facilitate a rapid database search of the biometric database. The BBC functions as a basket in which algorithmically distinct biometric samples are stored, such BBC's being some subset of all of the biometrics stored in the master comparator database.

BGL:
Biometric Group List: a software module in the DPC that is responsible for maintaining the configuration of the IBD machines.

BIA:
Biometric input apparatus; collects biometric identity information, encodes and encrypts it, and makes it available for authorizations. Comes in different hardware models and software versions.

Biometric:
A measurement taken by the system of some aspect of a recipient's physical person that can be used to repeatedly and uniquely identify an individual, such as a fingerprint, retina of the eye, face vascular patterns, voice prints, iris scan, and the like.

Biometric ID:
An identifier used by the system to uniquely identify an individual's biometric record (IRID—Individual Record ID).

BIO-BSN GROUP:
a collection of algorithmically dissimilar biometric samples linked to the same biometric sorting number.

BRT:
Recipient Registration Terminal; located at retail outlets, BRTs combine recipient registration information with selected personal information to register recipients with the system.

BSN:
Biometric Sorting Number: an identification number, which may or may not be unique, which is generated by numerically encoding the classified identification features of the submitted biometric and which thereby sorts the biometrics into subsets.

CBC:
Cipher Block Chaining: an encryption mode for the DES.

CCD:
Charged-Coupled Device.

Electronic Commercial Transaction:
A commercial transaction involves a reward provider proposing an electronic transaction to a recipient. If the recipient approves, he appends his biometric to the transaction, and sends it to the DPC for authorization and execution.

Commands:
A program or subroutine residing in the DPC that performs a specific task, activated by a request message sent from a BIA-equipped terminal.

CPT:
Cable-TV Point-of-Sale Terminal: combines an onscreen display simulcast digital signal informing TV-top cable box of product information with product video, and a BIA controller remote which performs the biometric validation using the CATV communications network. Order/autho/mailing-address/item-id forwarded to reward provider. Results of authorization are displayed on the TV.

CST:
Customer Service Terminals: provide system customer service personnel with varying degrees of access (based on access privilege) the ability to retrieve and modify information on recipients in order to help people with account problems.

Customer:
An individual user of the system or recipient, who can authorize transactions at a point of sale using nothing more than a biometric.

Data Sealing Step:
The conversion of plain text to cipher text (known as "encryption") in combination with the encrypted checksumming of a message that allows information to remain in plain text while at the same time providing a means for detecting any subsequent modification of the message.

DES:
Data Encryption Standard: a standard for the cryptographic protection of digital data. See standard ANSI X3.92-1981.

DPC:
A data processing center, also known as the computer system, which represents the place and the entity where the hardware, software, and personnel are located that support a multigigabyte biometric identity database. A DPC processes electronic messages, most of which involve performing biometric identity checks as a precursor to performing a rewards transaction.

DSP:
Digital Signal Processor: a class of integrated circuits that specialize in the mathematical operations required by the signal processing applications.

DUKPT:
Derived Unique Key Per Transaction: See standard ANSI/ABA X9.24-1992.

Electronic Identicator System:
The computer system or the DPC.

Emergency Account Index Code:
The alpha-numeric digit or sequence selected by a recipient which, when accessed, will result in a transaction being labelled by the system as an emergency transaction, potentially causing the display of false screens and/or the notification of authorities that the recipient has been coerced into performing a transmission or transaction.

FAR (False Accept Rate):
The statistical likelihood that one recipient's biometric will be incorrectly identified as the biometric of another recipient.

FDDI:
Fiber Digital Device Interface: a networking device that utilizes a fiber optic token ring.

FS:
Field Separator.

FW:
Firewall Machine: the Internet-local net router that regulates traffic into and out of the DPC.

GM:
Gateway Machine: the main processing computers in the DPC; runs most of the software.

IBD:
Individual Biometric Database: central repository for biometric, rewards account, and other personal information. Queries against the biometric database are used to verify identity for electronic rewards transactions and transmissions.

ID:
Issuer Database: central repository containing the institutions that are allowed to add and delete rewards account numbers with the system.

IML:
IBD Machine List: a software module in the DPC determines which IBD machines are responsible for which biometric sorting numbers.

Internet Reward Provider:
A party selling services or goods to recipients by means of the Internet electronic network.

IPT:
Internet Point-of-Sale Terminal: retrieves items and reward provider identification code from the Internet, gathers BIA biometric for validation, sends using Internet, autho/order/PO # forwarded to reward provider who in turn forwards to DPC. DPC response forwarded by reward provider to IPT using Internet as well, which displays results on screen.

Issuer:
a rewards account issuer for rewards assests to be registered with the DPC.

Issuer Batch:
A collection of "add" and "delete" instructions complete with biometric IDs, rewards accounts, and account index codes verified and submitted by an issuer to the DPC.

IT:
Issuer Terminals; provides a batch connection to the system for issuers to add and remove (their own) rewards account numbers from specific recipient's IBD records.

MAC:
Message Authentication Code: an encrypted checksum algorithm, the MAC provides assurance that the contents of a message have not been altered subsequent to the MAC calculation. See standard ANSI X9.9-1986.

MACM:
Message Authentication Code Module: a software module in the DPC that handles MAC validation and generation for inbound and outbound packets.

MDM:
Message Decrypt Module: a software module in the DPC that encrypts and decrypts packets from or destined to a BIA device.

MPM:
Message Processing Module: a software module in the DPC that performs the processing of request packets.

PIN:
Personal identification number: an alphabetical, numerical or alpha-numerical code which the recipient may use in combination with his biometric.

PFD:
: Prior Fraud Database: central repository for IBD records which have had prior fraud associated with them. During registration, every new applicant's biometrics are checked to see if a re-registration is occuring against all PFD records with the intent of reducing recidivism.

RAM:
: Random Access Memory.

RF:
: Radio Frequency: generally refers to radio frequency energy emitted during the normal operation of electrical devices.

Registers:
: Memory reserved for a specific purpose, data set aside on chips and stored operands to instructions.

Requests:
: Electronic instructions from the BIA to DPC instructing the DPC to identify the recipient and thereby process the recipient's command in the event the identication is successful.

Rewards Account Index Code:
: A digit or an alpha-numeric sequence that corresponds to a particular rewards account.

RSD:
: Remote Reward provider Database: contains all reward provider identification codes for reward provider telephone and Cable TV order shops; indexed by reward provider ID. Contains per-reward provider system encryption codes as well.

SCA:
: Reward provider Computing Apparatus: In the cache computing embodiment, wherein there is a master comparator biometric database containing the biometric samples of all users registered with the computer system, and at least one local database, physically remote from the master comparator biometric database containing a subset of the biometric samples contained in the master comparator biometric database, the SCA can be either a BIA or the reward provider computer containing the local database.

SECA:
: Secure Computing Apparatus: In the Internet or Intranet computing embodiment, the SECA is a device for: a) recipient data entry, whereby the recipient enters directly into the SECA at least one registration biometric sample and at least one recipient rewards account, together comprising the recipient personal authentication to information, and; b) for encryption, whereby all data entered into the secure computing apparatus is encrypted so that the data, when transmitted from the secure computing apparatus, cannot be read or altered by a recipient's personal computer;

SNM:
: Sequence Number Module: a software module in the DPC that handles the DUKPT sequence number processing for inbound request packets. Sequence number processing protects against replayattacks.

Terminal:
: A device that uses the BIA to collect biometric samples and form request messages that are subsequently sent to the DPC for authorization and execution. Terminals almost always append ancillary information to request messages, identifying counterparties and the like.

Token:
: An inanimate object conferring a capability.

Transaction:
: An electronic financial, service or product exchange.

VAD:
: Valid Apparatus Database: central repository in which each BIA (with associated unique encryption codes) is identified, along with the owner of the BIA.

What is claimed is:

1. A method for processing tokenless electronic consumer rewards between a reward provider and a recipient using an electronic identicator comparator and at least one recipient biometric data, comprising:
   a. creating an electronic registry of a reward provider's products or services each having a predetermined rewards value, the rewards being disbursed to recipients based upon an occurrence of predetermined criteria, thus forming a rewards registry;
   b. a recipient registration step, wherein the recipient registers with the electronic identicator comparator at least one registration biometric sample, and recipient specific data;
   c. a tokenless recipient identification step, wherein the identicator comparator compares a recipient bid biometric sample with previously registered biometric samples for producing either a successful or failed identification of the recipient;
   d. an electronic rewards calculation step, wherein upon the successful identification of the recipient, the recipient's rewards are calculated resultant from the recipient's product purchases pursuant to a reward provider's proposed commercial transaction and pursuant to a recipient purchasing registry;
   e. a recipient rewards issuance step, wherein the rewards provider issues electronic rewards to the successfully identified recipient; and
   f. a recipient notification step, wherein pursuant to a consummation of the commercial transaction, the recipient is notified of the results of the electronic rewards calculation,
   wherein an electronic consumer rewards transaction is conducted without the recipient using any tokens.

2. The method of claim 1 further comprising a commercial transaction adjustment step, wherein the proposed commercial transaction is adjusted pursuant to the electronic rewards calculation.

3. The method of claim 1 further comprising a recipient notification step, wherein the recipient is notified of the results of the recipient rewards account adjustment.

4. A method for processing tokenless electronic consumer rewards between a reward provider and a recipient using an electronic identicator comparator and at least one recipient biometric data, comprising:
   a. creating an electronic registry of a reward provider's products or services each having a predetermined rewards value, the rewards being disbursed to recipients based upon an occurrence of predetermined criteria, thus forming a rewards registry;
   b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient;

d. a recipient rewards issuance step, wherein the rewards provider issues electronic rewards to the successfully identified recipient; and e. an external communications step, wherein a computer system communicates with one or more external computer systems in order to perform various functions, including determining if the recipient has multiple rewards that are linked to certain purchases, wherein an electronic consumer rewards transaction is conducted without the recipient using any tokens.

5. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient; and d. a recipient rewards issuance step, wherein the rewards provider issues electronic rewards to the successfully identified recipient, wherein an electronic consumer rewards transaction is conducted without the recipient using any tokens, the recipient is co-located with the reward provider, and transaction proposals and other information is transmitted from reward provider to recipient and vice versa using an intranet.

6. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient; and d. a recipient rewards issuance step, wherein the rewards provider issues electronic rewards to the successfully identified recipient, wherein an electronic consumer rewards transaction is conducted without the recipient using any tokens, the recipient is remote from the reward provider, and transaction proposals and other information is transmitted from reward provider to recipient and vice versa using the Internet.

7. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient;

d. a recipient rewards issuance step, wherein the rewards provider issued electronic rewards to the successfully identified recipient; and e. a fraud detection step, wherein:
1. the biometric samples of individuals who have previously attempted fraud upon an identification computer system are stored within a fraud biometric database; and
2. the biometric samples of individuals registering with the system are compared against the biometric samples in the fraud biometric sample database to screen for fraud attempts, wherein an electronic consumer rewards transaction is conducted without the recipient using any tokens.

8. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient;

d. a recipient rewards issuance step, wherein the rewards provider issues electronic rewards to the successfully identified recipient; and e. a recipient PIN creation step, comprising:
1. a recipient PIN selection step, wherein the recipient selects a PIN;
2. a biometric comparison step, wherein a computer system then conducts a comparison of the biometric gathered from the recipient with any biometrics already grouped with the selected PIN, such a grouping of any biometrics associated with the same PIN defining a PIN basket;
3. in the event the new registrant's biometric is too similar to any of the registered biometrics currently in the selected PIN basket, that PIN is rejected and an alternative PIN is selected by the recipient for another such biometric comparison; and 4. once the computer system is presented with a PIN basket that has no confusingly similar biometrics, the new registrant's biometric is stored in that PIN basket, wherein an electronic consumer rewards transaction is conducted without the recipient using any tokens.

9. The method of claim 8 further comprising a fraud prevention step, wherein in the event of the theft of biometric information, the PIN basket in which the person's biometric samples reside is changed to prevent fraudulent use of the biometric sample to authorize transactions.

10. The method of claim 8 further comprising:
   a. a bid step, comprising entering a bid personal identification number by a candidate individual, and entering a bid biometric sample by said candidate individual;
   b. a comparison step comprising: locating the biometric basket that is entered by said candidate individual, and; comparing of the bid biometric sample from said candidate individual with all of the biometric samples stored in the identified biometric basket for producing either a successful or failed identification result.

11. A method for processing tokenless electronic consumer rewards between a reward provider and a recipient using an electronic identicator comparator and at least one recipient biometric data, comprising:
   a. creating an electronic registry of a reward provider's products or services each having a predetermined rewards value, the rewards being disbursed to recipients based upon an occurrence of predetermined criteria, thus forming a rewards registry;
   b. a recipient registration step, wherein the recipient registers with the electronic identicator comparator at least one registration biometric sample, and recipient specific data;
   c. a tokenless recipient identification step, wherein the identicator comparator compares a recipient bid biometric sample with previously registered biometric samples for producing either a successful or failed identification of the recipient;
   d. a recipient rewards issuance step, wherein the rewards provider issues electronic rewards to the successfully identified recipient; and
   e. a recipient PIN selection step, wherein the recipient selects a PIN from several generated for him by a computer system as follows, comprising:
      1. an automatic comparison step, wherein a comparison of the new registrant's biometric with any biometrics resident in various PIN baskets is automatically conducted; and
      2. a selection step, wherein several PIN options without a confusingly similar biometric are presented to the new registrant from which the recipient may select one PIN, wherein an electronic consumer rewards transaction is conducted without the recipient using any tokens.

12. A method for processing tokenless electronic consumer rewards between a reward provider and a recipient using an electronic identicator comparator and at least one recipient biometric data, comprising:
   a. creating an electronic registry of a reward provider's products or services each having a predetermined rewards value, the rewards being disbursed to recipients based upon an occurrence of predetermined criteria, thus forming a rewards registry;
   b. a recipient registration step, wherein the recipient registers with the electronic identicator comparator at least one registration biometric sample, and recipient specific data;
   c. a tokenless recipient identification step, wherein the identicator comparator compares a recipient bid biometric sample with previously registered biometric samples for producing either a successful or failed identification of the recipient;
   d. a recipient rewards issuance step, wherein the rewards provider issues electronic rewards to the successfully identified recipient; and
   e. rapid search of previously stored biometric samples from individuals using at least two biometric baskets, at least one biometric basket containing at least two algorithmically unique biometric samples from different individuals, as follows:
      1. a storage step further comprising gathering a biometric from an individual;
      2. a selection step, wherein a recipient's personal identification number is selected that indexes a biometric basket;
      3. a comparison step, wherein the biometric sample gathered from said individual is compared with all previously stored biometric samples in the biometric basket to make sure that the biometric sample gathered from the individual is algorithmically unique from all biometric samples currently stored in said biometric basket, for producing a successful or failed uniqueness result; and
      4. upon return of a successful uniqueness result, the gathered biometric sample is stored in the selected biometric basket, wherein an electronic consumer rewards transaction is conducted without the recipient using any tokens.

13. A method for processing tokenless electronic consumer rewards between a reward provider and a recipient using an electronic identicator comparator and at least one recipient biometric data, comprising:
   a. creating an electronic registry of a reward provider's products or services each having a predetermined rewards value, the rewards being disbursed to recipients based upon an occurrence of predetermined criteria, thus forming a rewards registry;
   b. a recipient registration step, wherein the recipient registers with the electronic identicator comparator at least one registration biometric sample, and recipient specific data;
   c. converting a raster image of a biometric sample to vector lines in order to generate an identification value for the biometric sample;
   d. a tokenless recipient identification step, wherein the identicator comparator compares a recipient bid biometric sample with previously registered biometric samples for producing either a successful or failed identification of the recipient; and
   e. a recipient rewards issuance step, wherein the rewards provider issues electronic rewards to the successfully identified recipient, wherein an electronic consumer rewards transaction is conducted without the recipient using any tokens.

14. The method of claim 13 wherein:
a. the biometric is a fingerprint;
b. the raster image pixels are converted to vector lines along the fingerprint ridges and the vector lines are classified and converted according to type;

c. the line types are then analyzed and a list of identification features corresponding to the vector line types is generated;

d. the identification features between the vector lines types are compared the image is classified according to fingerprint class;

e. a numerical encoding is generated to classify the biometric sample's identifying features, said number being a biometric sorting number.

15. The method of claim 14 wherein the biometric sorting number comprises any of the following: it is shared by several registered biometrics which have similar principle biometric characteristics; it contains one singular biometric.

16. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a use-sensitive tokenless identification step for rapidly determining a frequent user's identity by performing a comparison of the frequent user's biometric with another frequent user biometric stored in a local computer which contains a subset of the total system's biometric samples for producing either a successful or failed identification of the recipient; and d. a recipient rewards issuance step, wherein the rewards provider issues electronic rewards to the successfully identified recipient, wherein an electronic consumer rewards transaction is conducted without the recipient using any tokens.

17. A method for processing tokenless electronic consumer rewards between a reward provider and a recipient using an electronic identicator comparator and at least one recipient biometric data, comprising:

a. creating an electronic registry of a reward provider's products or services each having a predetermined rewards value, the rewards being disbursed to recipients based upon an occurrence of predetermined criteria, thus forming a rewards registry;

b. a recipient registration step, wherein the recipient registers with the electronic identicator comparator at least one registration biometric sample, and recipient specific data;

c. a tokenless recipient identification step, wherein the identicator comparator compares a recipient bid biometric sample with previously registered biometric samples for producing either a successful or failed identification of the recipient;

d. a recipient rewards issuance step, wherein the rewards provider issues electronic rewards to the successfully identified recipient; and e. a computer system authenticator step, comprising a private code, distinct from a personal identification number and not used to gain access to the computer system, previously gathered from the user and recorded in the central computer data bases, and presented to only the user after an identification attempt, whereby the user is assured that the authentic computer system was used to process the account access because a false computer system would not be able to present the customer's private code, wherein an electronic consumer rewards transaction is conducted without the recipient using any tokens.

18. A system for processing tokenless electronic consumer rewards between a reward provider and a recipient using an electronic identicator comparator and at least one recipient biometric data, comprising;

a. means for creating an electronic registry of a reward provider's products or services each having a predetermined rewards value, the rewards being disbursed to recipients based upon an occurrence of predetermined criteria;

b. means for recipient registration, wherein the recipient registers with the electronic identicator comparator at least one registration biometric sample, and recipient specific data;

c. means for tokenless recipient identification, wherein the identicator comparator compares a recipient bid biometric sample with previously registered biometric samples for producing either a successful or failed identification of the recipient;

d. means for electronic rewards calculation, wherein upon the successful identification of the recipient, the recipient's rewards are calculated resultant from the recipient's product purchases pursuant to a reward provider's proposed commercial transaction and pursuant to a recipient purchasing registry;

e. means for recipient rewards issuance, wherein the rewards provider issues electronic rewards to the successfully identified recipient; and f. means for recipient notification, wherein pursuant to a consummation of the commercial transaction, the recipient is notified of the results of the electronic rewards calculation, wherein an electronic consumer rewards transaction is conducted without the recipient using any tokens.

19. The system of claim 18 further comprising means for commercial transaction adjustment, wherein the proposed commercial transaction is adjusted pursuant to the electronic rewards calculation.

20. The system of claim 18 further comprising means for recipient notification, wherein the recipient is notified of the results of the recipient rewards account adjustment.

21. A system for processing tokenless electronic consumer rewards between a reward provider and a recipient using an electronic identicator comparator and at least one recipient biometric data, comprising:

a. means for creating an electronic registry of a reward provider's products or services each having a predetermined rewards value, the rewards being disbursed to recipients based upon an occurrence of predetermined criteria;

b. means for recipient registration, wherein the recipient registers with the electronic identicator comparator at least one registration biometric sample, and recipient specific data;

c. means for tokenless recipient identification, wherein the identicator comparator compares a recipient bid biometric sample with previously registered biometric samples for producing either a successful or failed identification of the recipient;

d. means for recipient rewards issuance, wherein the rewards provider issues electronic rewards to the successfully identified recipient;

e. means for external communications, wherein a computer system communicates with one or more external computer systems in order to perform various functions, including determining if the recipient has multiple rewards that are linked to certain purchases, wherein an electronic consumer rewards transaction is conducted without the recipient using any tokens.

22. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient; and
   d. means for recipient rewards issuance, wherein the rewards provider issues electronic rewards to the successfully identified recipient,
   wherein an electronic consumer rewards transaction is conducted without the recipient using any tokens, the recipient is co-located with the reward provider, and transaction proposals and other information is transmitted from reward provider to recipient and vice versa using an intranet.

23. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient; and
   d. means for recipient rewards issuance, wherein the rewards provider issues electronic rewards to the successfully identified recipient,
   wherein an electronic consumer rewards transaction is conducted without the recipient using any tokens, the recipient is remote from the reward provider, and transaction proposals and other information is transmitted from reward provider to recipient and vice versa using the Internet.

24. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient;
   d. means for recipient rewards issuance, wherein the rewards provider issues electronic rewards to the successfully identified recipient; and
   e. means for fraud detection, comprising:
      1. means for data storage, wherein the biometric samples of recipients who have previously attempted fraud upon an identification computer system are stored within a fraud biometric database; and
      2. means for biometric comparison, wherein the biometric samples of those recipients registering with the system are compared against the biometric samples in the fraud biometric sample database to screen for fraud attempts,
   wherein an electronic consumer rewards transaction is conducted without the recipient using any tokens.

25. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient;
   d. means for recipient rewards issuance, wherein the rewards provider issues electronic rewards to the successfully identified recipient; and
   e. means for the recipient to create his own PIN, comprising:
      1. means for recipient PIN selection, wherein the recipient selects a PIN;
      2. means for biometric comparison, wherein a computer system then conducts a comparison of the biometric gathered from the recipient with any biometrics already grouped with the selected PIN, such a grouping of any biometrics associated with the same PIN defining a PIN basket;
      3. means for rejecting the selected PIN in the event the new registrant's biometric is too similar to any of the registered biometrics currently in the selected PIN basket; and
      4. means for storage, wherein once the computer system is presented with a PIN basket that has no confusingly similar biometrics, the new registrant's biometric is stored in that PIN basket, wherein an electronic consumer rewards transaction is conducted without the recipient using any tokens.

26. The system of claim 25 further comprising means for fraud prevention, wherein in the event of the theft of biometric information, the PIN basket in which the person's biometric samples reside is changed to prevent fraudulent use of the biometric sample to authorize transactions.

27. The system of claim 25 further comprising:
   a. means for entering a bid biometric, wherein a bid personal identification number is entered by a candidate individual, and a bid biometric sample is entered by said candidate individual;
   b. means for comparison, comprising: locating the biometric basket that is entered by said candidate individual, and; comparing of the bid biometric sample from said candidate individual with all of the biometric samples stored in the identified biometric basket for producing either a successful or failed identification result.

28. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient;
   d. means for recipient rewards issuance, wherein the rewards provider issues electronic rewards to the successfully identified recipient; and
   e. means for the recipient to select a PIN from several generated for him by a computer system, comprising:
      1. means for automatic comparison, wherein a comparison of the new registrant's biometric with any biometrics resident in various PIN baskets is automatically conducted; and
      2. means for selection, wherein several PIN options without a confusingly similar biometric are presented to the new registrant from which the recipient may select one PIN,
   wherein an electronic consumer rewards transaction is conducted without the recipient using any tokens.

29. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for tokenless recipient identification, wherein the identicator comparator compares a recipient bid biometric sample with previously registered biometric samples for producing either a successful or failed identification of the recipient;
   d. means for recipient rewards issuance, wherein the rewards provider issues electronic rewards to the successfully identified recipient; and
   e. means for rapid search of previously stored biometric samples from individuals, using at least two biometric baskets, at least one biometric basket containing at least two algorithmically unique biometric samples from different individuals, comprising:
      1. means for storage of a biometric gathered from an individual;
      2. means for PIN selection, wherein a recipient's personal identification number is selected that indexes a biometric basket;
      3. means for comparison, wherein the biometric sample gathered from said individual recipient is compared with all previously stored biometric samples in the biometric basket to make sure that the biometric sample gathered from the individual recipient is algorithmically unique from all biometric samples currently stored in said biometric basket, for producing a successful or failed uniqueness result; and
      4. means for biometric storage, wherein upon return of a successful uniqueness result, the gathered biometric sample is stored in the selected biometric basket,
   wherein an electronic consumer rewards transaction is conducted without the recipient using any tokens.

30. A system for processing tokenless electronic consumer rewards between a reward provider and a recipient using an electronic identicator comparator and at least one recipient biometric data, comprising:
   a. means for creating an electronic registry of a reward provider's products or services each having a predetermined rewards value, the rewards being disbursed to recipients based upon an occurrence of predetermined criteria;
   b. means for recipient registration, wherein the recipient registers with the electronic identicator comparator at least one registration biometric sample, and recipient specific data;
   c. means for conversion a raster image of a biometric sample to vector lines in order to generate an identification value for the biometric sample;
   d. means for tokenless recipient identification, wherein the identicator comparator compares a recipient bid biometric sample with previously registered biometric samples for producing either a successful or failed identification of the recipient;
   e. means for recipient rewards issuance, wherein the rewards provider issues electronic rewards to the successfully identified recipient,
   wherein an electronic consumer rewards transaction is conducted without the recipient using any tokens.

31. The system of claim 30 wherein the biometric is a fingerprint, said system further comprising;
   a. means for conversion, wherein raster image pixels are converted to vector lines along the fingerprint ridges and the vector lines are classified and converted according to type;
   b. means for data analysis, wherein the line types are then analyzed and a list of identification features corresponding to the vector line types is generated;
   c. means for comparison, wherein the identification features between the vector lines types are compared and the image is classified according to fingerprint class;

d. means for number generation, wherein a numerical encoding is generated to classify the biometric sample's identifying features, said number being a biometric sorting number.

32. The system of claim 31 further comprising means for any of the following: sharing of the biometric sorting number by several registered biometrics which have similar principle biometric characteristics; the biometric sorting number containing one singular biometric.

33. A system for processing tokenless electronic consumer rewards between a reward provider and a recipient using an electronic identicator comparator and at least one recipient biometric data, comprising:
  a. means for creating an electronic registry of a reward provider's products or services each having a predetermined rewards value, the rewards being disbursed to recipients based upon an occurrence of predetermined criteria;
  b. means for recipient registration, wherein the recipient registers with the electronic identicator comparator at least one registration biometric sample, and recipient specific data;
  c. means for use-sensitive tokenless identification, wherein a frequent user's identity is rapidly determined by performance of a comparison of the frequent user's biometric with other frequent user biometric stored in a local computer which contains a subset of the total system's biometric samples for producing either a successful or failed identification of the recipient;
  d. means for tokenless recipient identification, wherein the identicator comparator compares a recipient bid biometric sample with previously registered biometric samples for producing either a successful or failed identification of the recipient; and
  e. means for recipient rewards issuance, wherein the rewards provider issues electronic rewards to the successfully identified recipient,
  wherein an electronic consumer rewards transaction is conducted without the recipient using any tokens.

34. A system for processing tokenless electronic consumer rewards between a reward provider and a recipient using an electronic identicator comparator and at least one recipient biometric data, comprising:
  a. means for creating an electronic registry of a reward provider's products or services each having a predetermined rewards value, the rewards being disbursed to recipients based upon an occurrence of predetermined criteria;
  b. means for recipient registration, wherein the recipient registers with the electronic identicator comparator at least one registration biometric sample, and recipient specific data;
  c. means for tokenless recipient identification, wherein the identicator comparator compares a recipient bid biometric sample with previously registered biometric samples for producing either a successful or failed identification of the recipient;
  d. means for recipient rewards issuance, wherein the rewards provider issues electronic rewards to the successfully identified recipient; and
  e. means for computer system authentication, comprising a private code, distinct from a personal identification number and not used to gain access to a computer system, previously gathered from the user and recorded in the central computer data bases, and presented to only the user after an identification attempt, whereby the user is assured that the authentic computer system was used to process the account access because a false computer system would not be able to present the customer's private code,
  wherein an electronic consumer rewards transaction is conducted without the recipient using any tokens.

35. A system for processing tokenless electronic consumer rewards between a reward provider and a recipient using an electronic identicator comparator and at least one recipient biometric data, comprising:
  a. means for creating an electronic registry of a reward provider's products or services each having a predetermined rewards value, the rewards being disbursed to recipients based upon an occurrence of predetermined criteria;
  b. means for recipient registration, wherein the recipient registers with the electronic identicator comparator at least one registration biometric sample, and recipient specific data;
  c. means for tokenless recipient identification, wherein the identicator comparator compares a recipient bid biometric sample with previously registered biometric samples for producing either a successful or failed identification of the recipient;
  d. means for recipient rewards issuance, wherein the rewards provider issues electronic rewards to the successfully identified recipient; and
  e. fraud detector engine further comprising a fraud biometric comparator and fraud biometric data bases containing a subset of the biometric samples stored in the master Computer,
  wherein an electronic consumer rewards transaction is conducted without the recipient using any tokens.

36. A device for processing tokenless electronic consumer rewards between a reward provider and a recipient using an electronic identicator comparator and at least one recipient biometric data, comprising:
  a. an electronic registry device for storing a reward provider's products or services each having a predetermined rewards value, the rewards being disbursed to recipients based upon an occurrence of predetermined criteria;
  b. a recipient registration device for registration of at least one registration biometric sample and recipient specific data with the electronic identicator;
  c. a tokenless recipient identification device for comparing a recipients bid biometric sample with previously registered biometric samples for producing either a successful or failed identification of the recipient;
  d. an electronic rewards calculation device for calculating the recipient's rewards resultant from the recipient's product purchases pursuant to a reward provider's proposed commercial transaction and pursuant to a recipient purchasing registry, upon the successful identification of the recipient;
  e. a recipient rewards issuance device for the rewards provider issuing electronic rewards to the successfully identified recipient; and
  f. a recipient notification device for notifying the recipient of the results of the electronic rewards calculation pursuant to a consummation of the commercial transaction,
  wherein an electronic consumer rewards transaction is conducted without the recipient using any tokens.

37. The device of claim 36 further comprising a commercial transaction adjustment device for adjusting the proposed commercial transaction is pursuant to the electronic rewards calculation.

38. The device of claim 36 further comprising a recipient notification device for notifying the recipient of the results of the recipient rewards account adjustment.

39. A device for processing tokenless electronic consumer rewards between a reward provider and a recipient using an electronic identicator comparator and at least one recipient biometric data, comprising:
- a. an electronic registry device for storing a reward provider's products or services each having a predetermined rewards value, the rewards being disbursed to recipients based upon an occurrence of predetermined criteria;
- b. a recipient registration device for registration of at least one registration biometric sample and recipient specific data with the electronic identicator;
- c. a tokenless recipient identification device for comparing a recipient bid biometric sample with previously registered biometric samples for producing either a successful or failed identification of the recipient;
- d. a recipient rewards issuance device for the rewards provider issuing electronic rewards to the successfully identified recipient; and
- e. an external communications device for a computer system to communicate with one or more external computer systems in order to perform various functions including determining if the recipient has multiple rewards that are linked to certain purchases, wherein an electronic consumer rewards transaction is conducted without the recipient using any tokens.

40. A device for processing tokenless electronic consumer rewards between a reward provider and a recipient using an electronic identicator comparator and at least one recipient biometric data, comprising:
- a. an electronic registry device for storing a reward provider's products or services each having a predetermined rewards value, the rewards being disbursed to recipients based upon an occurrence of predetermined criteria;
- b. a recipient registration device for registration of at least one registration biometric sample and recipient specific data with the electronic identicator;
- c. a tokenless recipient identification device for comparing a recipient bid biometric sample with previously registered biometric samples for producing either a successful or failed identification of the recipient; and
- d. a recipient rewards issuance device for the rewards provider issuing electronic rewards to the successfully identified recipient, wherein an electronic consumer rewards transaction is conducted without the recipient using any tokens, the recipient is co-located with the reward provider, and transaction proposals and other information is transmitted from reward provider to recipient and vice versa using an intranet.

41. A device for processing tokenless electronic consumer rewards between a reward provider and a recipient using an electronic identicator comparator and at least one recipient biometric data, comprising:
- a. an electronic registry device for storing a reward provider's products or services each having a predetermined rewards value, the rewards being disbursed to recipients based upon an occurrence of predetermined criteria;
- b. a recipient registration device for registration of at least one registration biometric sample and recipient specific data with the electronic identicator;
- c. a tokenless recipient identification device for comparing a recipient bid biometric sample with previously registered biometric samples for producing either a successful or failed identification of the recipient; and
- d. a recipient rewards issuance device for the rewards provider issuing electronic rewards to the successfully identified recipient, wherein an electronic consumer rewards transaction is conducted without the recipient using any tokens, the recipient is remote from the reward provider, and transaction proposals and other information is transmitted from reward provider to recipient and vice versa using the Internet.

42. A device for processing tokenless electronic consumer rewards between a reward provider and a recipient using an electronic identicator comparator and at least one recipient biometric data, comprising:
- a. an electronic registry device for storing a reward provider's products or services each having a predetermined rewards value, the rewards being disbursed to recipients based upon an occurrence of predetermined criteria;
- b. a recipient registration device for registration of at least one registration biometric sample and recipient specific data with the electronic identicator;
- c. a tokenless recipient identification device for comparing a recipient bid biometric sample with previously registered biometric samples for producing either a successful or failed identification of the recipient;
- d. a recipient rewards issuance device for the rewards provider issuing electronic rewards to the successfully identified recipient; and
- e. a fraud detection device, comprising:
  1. a data storage device, for storing the biometric samples of individuals who have previously attempted fraud upon an identification computer system within a fraud biometric database; and
  2. a biometric comparison device, for comparing the biometric samples of those individuals registering with the system against the biometric samples in the fraud biometric sample database to screen for fraud attempts, wherein an electronic consumer rewards transaction is conducted without the recipient using any tokens.

43. A device for processing tokenless electronic consumer rewards between a reward provider and a recipient using an electronic identicator comparator and at least one recipient biometric data, comprising:
- a. an electronic registry device for storing a reward provider's products or services each having a predetermined rewards value, the rewards being disbursed to recipients based upon an occurrence of predetermined criteria;
- b. a recipient registration device for registration of at least one registration biometric sample and recipient specific data with the electronic identicator;
- c. a tokenless recipient identification device for comparing a recipient bid biometric sample with previously registered biometric samples for producing either a successful or failed identification of the recipient;
- d. a recipient rewards issuance device for the rewards provider issuing electronic rewards to the successfully identified recipient; and
- e. a device for the recipient to create his own PIN, comprising:
  1. a recipient PIN selection device for the recipient to select a PIN;

2. a biometric comparison device for a computer system to conduct a comparison of the biometric gathered from the recipient with any biometrics already grouped with the selected PIN, such a grouping of any biometrics associated with the same PIN defining a PIN basket;
3. a PIN rejection device for rejecting the selected PIN in the event the new registrant's biometric is too similar to any of the registered biometrics currently in the selected PIN basket; and
4. a storage device for storing the new registrant's biometric in the PIN basket when the computer system is presented with a PIN basket that has no confusingly similar biometrics, wherein an electronic consumer rewards transaction is conducted without the recipient using any tokens.

44. The device of claim 43 further comprising:
a. a bid biometric entering device for entering a bid personal identification number by a candidate individual, for entering a bid biometric sample by said candidate individual;
b. a comparison device, for: locating the biometric basket that is entered by said candidate individual, and; comparing of the bid biometric sample from said candidate individual with all of the biometric samples stored in the identified biometric basket for producing either a successful or failed identification result.

45. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a tokenless recipient identification device for comparing a recipient bid biometric sample with previously registered biometric samples for producing either a successful or failed identification of the recipient;
d. a recipient rewards issuance device for the rewards provider issuing electronic rewards to the successfully identified recipient; and
e. a recipient PIN selection device for the recipient to select a PIN from several generated for him by a computer system, comprising:
1. an automatic comparison device for automatically comparing the new registrant's biometric with any biometrics resident in various PIN baskets; and
2. a selection device for the recipient to select one PIN from several PIN options without a confusingly similar biometric which are presented to the next registrant, wherein an electronic consumer rewards transaction is conducted without the recipient using any tokens.

46. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;

b. a recipient registration device for registration of at least one registration biometric sample and recipient specific data with the electronic identicator;
c. a tokenless recipient identification device for comparing a recipient bid biometric sample with previously registered biometric samples for producing either a successful or failed identification of the recipient;
d. a recipient rewards issuance device for the rewards provider issuing electronic rewards to the successfully identified recipient; and
e. a fraud prevention device for changing the PIN basket in which the person's biometric samples reside is changed to prevent fraudulent use of the biometric sample to authorize transactions, wherein an electronic consumer rewards transaction is conducted without the recipient using any tokens.

47. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a tokenless recipient identification device for comparing a recipient bid biometric sample with previously registered biometric samples for producing either a successful or failed identification of the recipient;
d. a recipient rewards issuance device for the rewards provider issuing electronic rewards to the successfully identified recipient; and
e. a rapid search device for rapidly searching previously stored biometric samples from individuals, using at least two biometric baskets, at least one biometric basket containing at least two algorithmically unique biometric samples from different individuals, comprising:
1. a storage device for registration of a biometric gathered from an individual;
2. a PIN selection device for selecting an individual's personal identification number that indexes a biometric basket;
3. a comparison device for comparing the biometric sample gathered from said recipient with all previously stored biometric samples in the biometric basket to make sure that the biometric sample gathered from the individual is algorithmically unique from all biometric samples currently stored in said biometric basket, for producing a successful or failed uniqueness result; and
4. a biometric storage device for storing the gathered biometric sample in the selected biometric basket, upon return of a successful uniqueness result, wherein an electronic consumer rewards transaction is conducted without the recipient using any tokens.

48. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a conversion of a raster image of a biometric sample to vector lines in order to generate an identification value for the biometric sample;
d. a tokenless recipient identification device for comparing a recipient bid biometric sample with previously registered biometric samples for producing either a successful or failed identification of the recipient; and
e. a recipient rewards issuance device for the rewards provider issuing electronic rewards to the successfully identified recipient,
wherein an electronic consumer rewards transaction is conducted without the recipient using any tokens.

49. The device of claim 48 wherein the biometric is a fingerprint, said system further comprising;
a. a conversion device for converting raster image pixels to vector lines along the fingerprint ridges and the vector lines are classified and converted according to type;
b. a data analysis device for analyzing the line types and generating a list of identification features corresponding to the vector line types;
c. a comparison device for comparing the identification features between the vector lines types and classifying the image according to fingerprint class;
d. a number generation device for generating a numerical encoding to classify the biometric sample's identifying features, said number being a biometric sorting number.

50. The device of claim 49 further comprising a device for any of the following: sharing of the biometric sorting number by several registered biometrics which have similar principle biometric characteristics; the biometric sorting number containing one singular biometric.

51. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a use-sensitive tokenless identification device, for rapidly determining a frequent user's identity by performance of a comparison of the frequent user's biometric with other frequent user biometric stored in a local computer which contains a subset of the total system's biometric samples for producing either a successful or failed identification of the recipient;
d. a recipient rewards issuance device for the rewards provider issuing electronic rewards to the successfully identified recipient,
wherein an electronic consumer rewards transaction is conducted without the recipient using any tokens.

52. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a tokenless recipient identification device for comparing a recipient bid biometric sample with previously registered biometric samples for producing either a successful or failed identification of the recipient;
d. a recipient rewards issuance device for the rewards provider issuing electronic rewards to the successfully identified recipient; and
e. a computer system authentication device, comprising a private code, distinct from a personal identification number and not used to gain access to a computer system previously gathered from the user and recorded in the central computer data bases, and presented to only the user after an identification attempt, for the user to be assured that the authentic computer system was used to process the account access because a false computer system would not be able to present the customer's private code,
wherein an electronic consumer rewards transaction is conducted without the recipient using any tokens.

53. A device for processing tokenless electronic consumer rewards between a reward provider and a recipient using an electronic identicator comparator and at least one recipient biometric data, comprising:
a. an electronic registry device for storing a reward provider's products or services each having a predetermined rewards value, the rewards being disbursed to recipients based upon an occurrence of predetermined criteria;
b. a recipient registration device for registration of at least one registration biometric sample and recipient specific data with the electronic identicator;
c. a tokenless recipient identification device for comparing a recipient bid biometric sample with previously registered biometric samples for producing either a successful or failed identification of the recipient;
d. a recipient rewards issuance device for the rewards provider issuing electronic rewards to the successfully identified recipient; and
e. a fraud detector device further comprising a fraud biometric comparator and fraud biometric data bases containing a subset of the biometric samples stored in the master computer,
wherein an electronic consumer rewards transaction is conducted without the recipient using any tokens.

* * * * *